US012672108B2

(12) United States Patent
Liu et al.

(10) Patent No.: US 12,672,108 B2
(45) Date of Patent: Jun. 30, 2026

(54) METHOD FOR DETERMINING SIDELINK FEEDBACK INFORMATION AND COMMUNICATION DEVICE

(71) Applicant: VIVO MOBILE COMMUNICATION CO., LTD., Guangdong (CN)

(72) Inventors: Siqi Liu, Guangdong (CN); Zichao Ji, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 634 days.

(21) Appl. No.: 17/868,931

(22) Filed: Jul. 20, 2022

(65) Prior Publication Data

US 2022/0353849 A1     Nov. 3, 2022

Related U.S. Application Data

(63) Continuation of application No. PCT/CN2021/072729, filed on Jan. 19, 2021.

(30) Foreign Application Priority Data

Jan. 20, 2020     (CN) ......................... 202010066291.X

(51) Int. Cl.
*H04W 72/02* (2009.01)
*H04L 1/1812* (2023.01)
*H04W 72/0446* (2023.01)
*H04W 72/20* (2023.01)

(52) U.S. Cl.
CPC ........... *H04W 72/02* (2013.01); *H04L 1/1812* (2013.01); *H04W 72/0446* (2013.01); *H04W 72/20* (2023.01)

(58) Field of Classification Search
None
See application file for complete search history.

(56) References Cited

U.S. PATENT DOCUMENTS

| 2019/0363843 A1 | 11/2019 | Gordaychik |
| 2020/0022089 A1 | 1/2020 | Guo |
| 2021/0144750 A1* | 5/2021 | Cao ................... H04W 72/0453 |

(Continued)

FOREIGN PATENT DOCUMENTS

| CN | 110214427 A | 9/2019 |
| CN | 110311762 A | 10/2019 |

(Continued)

OTHER PUBLICATIONS

VIVO, Discussion on mode 1 resource allocation mechanism, 3GPP TSG RAN WG1 Meeting #98bis, R1-1911419, Oct. 14-20, 2019, Chongqing, China.

(Continued)

*Primary Examiner* — Jenkey Van
(74) *Attorney, Agent, or Firm* — Price Heneveld LLP

(57) ABSTRACT

A method for determining sidelink feedback information and a communication device are disclosed. The method includes: determining sidelink hybrid automatic repeat request SL HARQ feedback information based on a target physical sidelink feedback channel PSFCH resource set associated with a target uplink channel, where the target PSFCH resource set is determined based on a target time interval, where the target time interval is a spacing between the target uplink channel and a PSFCH.

18 Claims, 4 Drawing Sheets

(56) References Cited

U.S. PATENT DOCUMENTS

| | | | | |
|---|---|---|---|---|
| 2021/0168762 A1* | 6/2021 | Huang | ................. | H04B 7/0456 |
| 2022/0116996 A1* | 4/2022 | Lee | .................. | H04W 74/0816 |
| 2022/0140958 A1 | 5/2022 | Zhou et al. | | |

FOREIGN PATENT DOCUMENTS

| | | |
|---|---|---|
| CN | 110545533 A | 12/2019 |
| EP | 3832932 A1 | 6/2021 |

OTHER PUBLICATIONS

CATT, Sidelink physical layer procedures in NR V2X, 3GPP TSG RAN WG1 Meeting #99, R1-1912159, Nov. 18-22, 2019, Reno, USA.

Ericsson, "Feature lead summary#2 on Resource allocation for NR sidelink Mode 1", 3GPP TSG-RAN WG1 Meeting #99, R1-1913547, Chongqing, China, Nov. 18-22, 2019.

Huawei, Hisilicon, "Sidelink physical layer procedures for NR V2X", 3GPP TSG RAN WG1 Meeting #99, R1-1911887, Reno, USA, Nov. 18-22, 2019.

Fujitsu, "Discussion on mode 1 resource allocation for NR V2X", 3GPP TSG RAN WG1 #99, R1-1912078, Reno, USA, Nov. 18-22, 2019.

Oppo, "Physical layer structure for NR-V2X", 3GPP TSG RAN WG1 #99, R1-1912789, Reno, USA, Nov. 18-22, 2019.

Second European Office Action for European Patent Application No. 21 744 963.6, dated Oct. 7, 2025, 7 pages.

\* cited by examiner

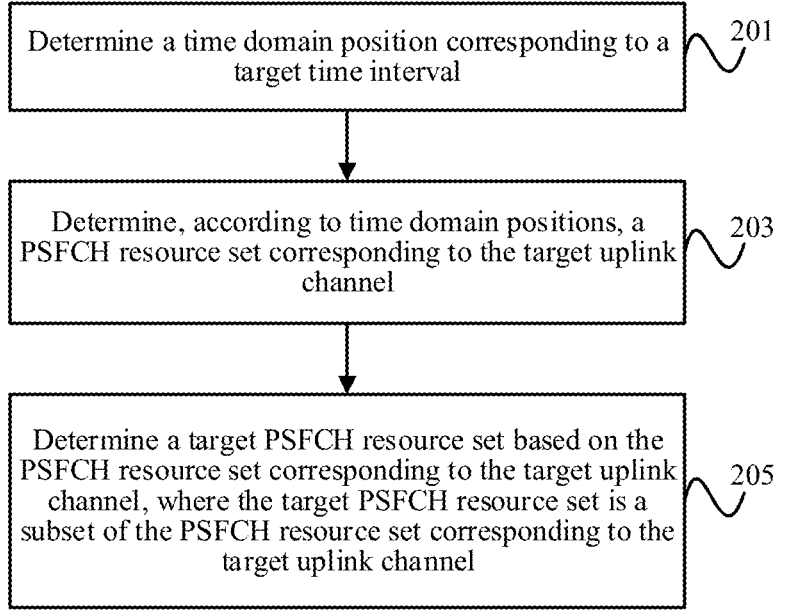

Determine sidelink hybrid automatic repeat request SL HARQ feedback information based on a target physical sidelink feedback channel PSFCH resource set associated with a target uplink channel, where the target PSFCH resource set is determined based on a target time interval, where the target time interval is a spacing between the target uplink channel and a PSFCH    101

FIG. 1

Determine a time domain position corresponding to a target time interval    201

Determine, according to time domain positions, a PSFCH resource set corresponding to the target uplink channel    203

Determine a target PSFCH resource set based on the PSFCH resource set corresponding to the target uplink channel, where the target PSFCH resource set is a subset of the PSFCH resource set corresponding to the target uplink channel    205

FIG. 2

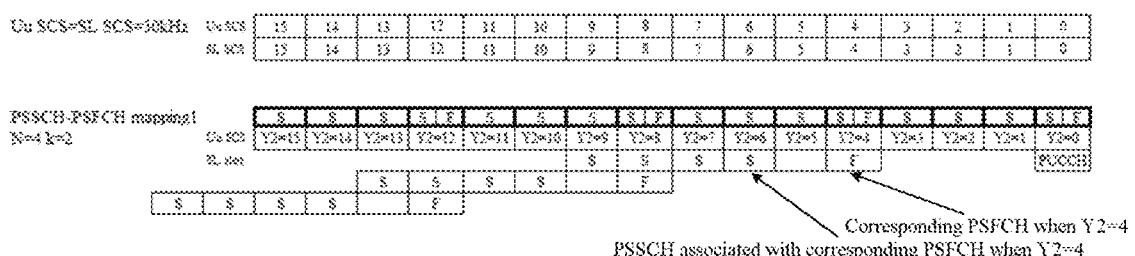
Corresponding PSFCH when Y2=4
PSSCH associated with corresponding PSFCH when Y2=4
FIG. 3
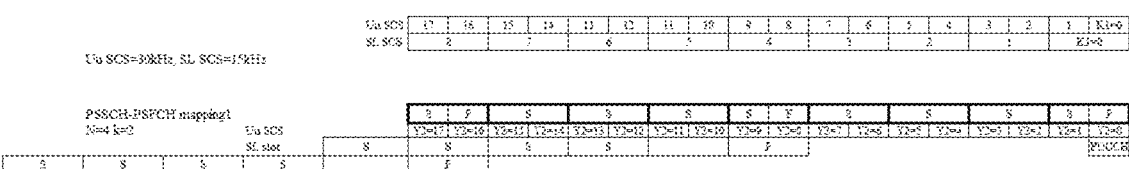
FIG. 4
FIG. 5
FIG. 6

METHOD FOR DETERMINING SIDELINK FEEDBACK INFORMATION AND COMMUNICATION DEVICE

CROSS-REFERENCE TO RELATED APPLICATIONS

This application is a continuation application of PCT International Application No. PCT/CN2021/072729 filed on Jan. 19, 2021, which claims the priority of Chinese Patent Application No. 202010066291.X filed in China on Jan. 20, 2020, the entire contents of which are hereby incorporated by reference in their entireties.

TECHNICAL FIELD

The present invention relates to the field of communication, and in particular, to a method for determining sidelink feedback information and a communication device.

BACKGROUND

Currently, the new radio (NR) mobile communication system (NR system for short) supports sidelink (SL, which may also be referred to as a direct link or the like) transmission. To improve the reliability and the resource utilization of data transmission on the SL, the hybrid automatic repeat request (HARQ) feedback mechanism is introduced to the SL technology.

Specifically, the process of the SL HARQ feedback mechanism may include that: After receiving SL data, an SL receiving user feeds back SL HARQ feedback information to indicate whether SL transmission succeeds or fails. After receiving the SL HARQ feedback information on an SL, an SL sending user can learn whether the previous SL transmission succeeds. An SL user may be a sending user or a receiving user, that is, the same user can perform receiving or sending separately in different time or frequency domains. The SL HARQ feedback information includes acknowledgment (ACK) information and negative acknowledgment (NACK) information.

In addition, transmission of an SL data packet may be performed on an SL between a user and a user. Therefore, it is likely that a control node cannot directly learn whether the transmission of the SL data packet succeeds, and the user is required to send SL HARQ feedback information to the control node, so that the control node can further determine whether the transmission on the SL succeeds.

Therefore, a solution for determining sidelink feedback information is needed to achieve efficient and reliable HARQ feedback on a sidelink, thereby accurately reflecting whether data transmission on the sidelink succeeds.

SUMMARY

According to a first aspect, an embodiment of the present invention provides a method for determining sidelink feedback information, applied to a communication device, the method including:

determining sidelink hybrid automatic repeat request SL HARQ feedback information based on a target physical sidelink feedback channel PSFCH resource set associated with a target uplink channel, where the target PSFCH resource set is determined based on a target time interval, where the target time interval is a spacing between the target uplink channel and a PSFCH.

According to a second aspect, an embodiment of the present invention provides a communication device, including:

a determining module, configured to determine sidelink hybrid automatic repeat request SL HARQ feedback information based on a target physical sidelink feedback channel PSFCH resource set associated with a target uplink channel, where the target PSFCH resource set is determined based on a target time interval, where the target time interval is a spacing between the target uplink channel and a PSFCH.

According to a third aspect, an embodiment of the present invention provides a communication device, including: a memory, a processor, and a computer program stored in the memory and executable on the processor, where when executed by the processor, the computer program implements the steps of the method according to the first aspect.

According to a fourth aspect, an embodiment of the present invention further provides a computer-readable storage medium, storing a computer program, where when executed by a processor, the computer program performs the steps of the method according to the first aspect.

BRIEF DESCRIPTION OF THE DRAWINGS

Accompanying drawings described herein are used for providing further understanding about the present invention, and constitute one portion of the present invention. Exemplary embodiments of the present invention and descriptions thereof are used for explaining the present invention, and do not constitute an inappropriate limitation on the present invention. In the accompanying drawings:

FIG. 1 is a schematic flowchart of a method for determining sidelink feedback information according to an embodiment of the present invention;

FIG. 2 is a schematic flowchart of a method for determining a target PSFCH resource set according to an embodiment of the present invention;

FIG. 3 is a schematic diagram of a sidelink channel resource correspondence in a scenario in which a Uu SCS is equal to an SL SCS according to an embodiment of the present invention;

FIG. 4 is a schematic diagram of a sidelink channel resource correspondence in a scenario in which a Uu SCS is greater than an SL SCS according to an embodiment of the present invention;

FIG. 5 is a schematic diagram of a sidelink channel resource correspondence in a scenario in which a Uu SCS is less than an SL SCS according to an embodiment of the present invention;

FIG. 6 is a schematic diagram of another sidelink channel resource correspondence in a scenario in which a Uu SCS is less than an SL SCS according to an embodiment of the present invention;

DETAILED DESCRIPTION

Figure 7:
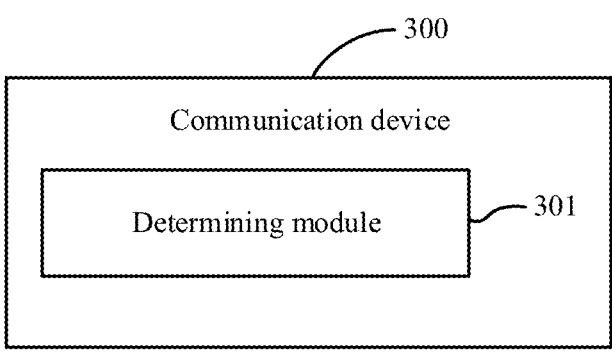
FIG. 7 is a schematic structural diagram of a communication device according to an embodiment of the present invention.

The following clearly describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present invention.

The technical solutions of the present invention may be applied to various communication systems, for example, a Global System for Mobile Communications (GSM), a Code Division Multiple Access (CDMA) system, Wideband Code Division Multiple Access (WCDMA), a general packet radio service (GPRS), Long Term Evolution/Long Term Evolution Advanced (LTE-A), and NR.

Client UE, also referred to as a terminal device (Mobile Terminal), mobile user equipment, or the like, may communicate with one or more core networks through a radio access network (RAN). The user equipment may be a terminal device, such as a mobile phone (also referred to as a "cellular" phone) and a computer with a mobile terminal. For example, the user equipment may be a portable, pocket-sized, handheld, computer built-in, or in-vehicle mobile apparatus, which exchanges languages and/or data with the radio access network.

A network device, also referred to as a base station, may be a base station (Base Transceiver Station, BTS) in GSM or CDMA, may be a base station (NodeB) in WCDMA, or may be an evolved base station (evolved NodeB, eNB, or e-NodeB) in LTE or a 5G base station (gNB).

In the embodiments of the present invention, the NR SL supports three transmission modes: broadcast, multicast, and unicast. The multicast transmission mode of the NR SL supports two use cases, that is, connection-based multicast and connectionless multicast. The connection-based multicast mode refers to a scenario in which a connection is established between UEs of multicast, and the connection-less multicast mode refers to a scenario in which UEs of multicast do not know other UEs in a group and do not establish a connection. In a case of multicast, a plurality of receiving ends support two mechanisms when performing HARQ feedback:

Mechanism 1 (option1 NACK-only feedback, or connectionless mechanism): If the data is received but cannot be decoded, NACK information is fed back; otherwise, no feedback is performed. In this case, if not receiving a NACK, a sending end considers that all the receiving ends have successfully received and decoded the data. This mode is applicable to a connectionless multicast scenario.

Mechanism 2 (option2 ACK/NACK feedback, or connection-based mechanism): If the data is received but cannot be decoded, or if sidelink control information (SCI) is received, but no data is received, NACK information is fed back, and if the data is received and correctly decoded, ACK information is fed back. In this case, if the sending end receives a NACK sent by a receiving end user or does not receive an ACK or a NACK, the sending end considers that transmission sent to the receiving end user fails. If receiving an ACK sent by a specific receiving end, the sending end considers that transmission sent to a user of the receiving end succeeds, and if receiving ACKs sent by all the receiving ends, the sending end considers that transmission of a corresponding transport block (TB) succeeds. This mode is applicable to a connection-based multicast scenario.

The technical solutions provided in the embodiments of the present invention are described in detail below with reference to the accompanying drawings.

Referring to FIG. 1, the embodiments of the present invention provide a method for determining sidelink feedback information, executed by a communication device. The communication device may be a network device or a terminal device. The method includes following process steps:

Step 101: Determine sidelink hybrid automatic repeat request SL HARQ feedback information based on a target physical sidelink feedback channel PSFCH resource set associated with a target uplink channel, where the target PSFCH resource set is determined based on a target time interval, where the target time interval is a spacing between the target uplink channel and a target PSFCH.

Optionally, the target uplink channel is used for transmission of SL HARQ feedback information, and may include a physical uplink control channel (PUCCH) or a physical uplink shared channel (PUSCH). The target uplink channel may be allocated by the network device.

Optionally, the target time interval between the target uplink channel and the target physical sidelink feedback channel (PSFCH) includes a slot spacing, for example, 0 slot to 15 slots. The spacing may be configured or indicated by the network device. There may be one or more target time intervals. In addition, a feedback position of SL HARQ feedback information corresponding to PSFCH resources in the target PSFCH resource set on the target uplink channel may be determined based on the target time interval. The target time interval may be indicated by the network device by using Radio Resource Control (RRC) signaling, downlink control information (DCI), or other signaling.

Optionally, in an example, a starting point of the target time interval may be a starting point of a time domain resource (for example, a slot) at which the PSFCH is located, and an end point thereof is a starting point of a time domain resource (for example, a slot) at which the target uplink channel is located. It should be noted that there may be other cases for the starting point and the end point of the target time interval. For example, the starting point of the target time interval may be an end point of a time domain resource (for example, a slot) at which the PSFCH is located or may be a receiving moment of the PSFCH.

Optionally, the target time interval may be explained according to an air interface sub-carrier spacing (Uu SCS). The air interface (Uu, where U represents a user to network interface, and u represents universal) is configured to implement communication between UE and an evolved Evolved Universal Terrestrial Radio Access Network (EUTRAN). A sub-carrier spacing (SCS) may also be referred to as a PUCCH SCS or a UL SCS. The Uu SCS may be a PUCCH SCS or an uplink SCS, but is not limited thereto.

Optionally, the SL HARQ feedback information includes ACK information or NACK information. A value of a feedback bit corresponding to ACK information may be set to "1", and a value of a feedback bit corresponding to NACK information is set to "0". Alternatively, a value of a feedback bit corresponding to ACK information may be set to "0", and a value of a feedback bit corresponding to NACK information is set to "1". Further, transmission of the SL HARQ feedback information is performed on the target uplink channel in the format of an SL codebook, to feed back SL HARQ feedback information corresponding to a plurality of pieces of data, for example, SL HARQ feedback information corresponding to a plurality of TBs, on a same resource, to reduce the complexity of feedback. An optional implementation is that the SL codebook may be a bitmap or a matrix. In addition, a mode of constructing an SL codebook based on the SL HARQ feedback information determined in the embodiments of the present invention may reduce the burden of a user in aspects, such as reporting and encoding complexity, and lower codebook overheads while improving the reliability of feeding back SL HARQ feedback information based on uplink transmission.

Optionally, there may be one or more resources in the target PSFCH resource set. In addition, the target PSFCH resource set may be a set of time domain resources, for example, a set of PSFCH occasions, or may be resources in another dimension, for example, a frequency domain dimension, a carrier dimension, or a terminal device, that is, a user dimension. That is, the target PSFCH resource set may be a set of resources corresponding to a plurality of dimensions.

In the embodiments of the present invention, a target PSFCH resource set associated with a target uplink channel can be accurately derived from a target time interval between the target uplink channel and a physical sidelink feedback channel PSFCH, to establish a mapping relationship between the target uplink channel and the target PSFCH resource set, so that based on this, SL HARQ feedback information corresponding to the target PSFCH resource set may be mapped to the target uplink channel for reporting. In this way, efficient and reliable HARQ feedback on the sidelink is achieved, so that a receiving party of the SL HARQ feedback information can accurately learn whether data transmission on the sidelink succeeds, thereby improving the reliability and the resource utilization of the data transmission on the SL.

Optionally, referring to FIG. 2, a specific embodiment of the method for determining SL feedback information provided in the embodiments of the present invention may further include the following process steps, to determine a target PSFCH resource set associated with the target uplink channel:

Step 201: Determine a time domain position corresponding to the target time interval.

Step 203: Determine, according to the time domain positions, a PSFCH resource set corresponding to the target uplink channel.

It may be understood that, a feedback window, that is, the time domain position, of the target uplink channel may be determined based on the target time interval, and further, all PSFCH resources in the time domain position can be determined as resources in the PSFCH resource set corresponding to the target uplink channel.

For example, if the target time interval is represented by Y2, and a slot, that is, a time domain position, at which the target uplink channel is located is represented by slot n, the time domain position corresponding to Y2 includes a slot corresponding to (n−Y2), and further, PSFCH resources (for example, PSFCH occasions) in the slot corresponding to (n−Y2) are all resources in the PSFCH resource set corresponding to the target uplink channel.

Optionally, the slot may be a Uu slot. In this case, the Uu slot corresponding to Y2 refers to a slot that corresponds to (n−Y2) and of which an SCS is a Uu SCS.

Optionally, the slot may be an SL slot. In this case, the SL slot corresponding to Y2 refers to one or more SL slots that overlap with a slot (n−Y2). For example, when Uu SCS<sidelink sub-carrier spacing SL SCS, a plurality of SL slots correspond to the slot (n−Y2).

Step 205: Determine the target PSFCH resource set based on the PSFCH resource set corresponding to the target uplink channel, where the target PSFCH resource set is a subset of the PSFCH resource set corresponding to the target uplink channel.

It may be understood that after the PSFCH resource set corresponding to the target uplink channel is derived based on the target time interval, that is, the target PSFCH resource set associated with the target uplink channel may be obtained based on the PSFCH resource set corresponding to the target uplink channel. The target PSFCH resource set is a subset of the PSFCH resource set corresponding to the target uplink channel, that is, some or all resources in the PSFCH resource set corresponding to the target uplink channel are used as resources in the target PSFCH resource set.

Optionally, in the method for determining SL feedback information provided in the embodiments of the present invention, based on different compositions of resources in the PSFCH resource set corresponding to the target uplink channel, step 205 may be correspondingly performed as different solutions, and includes, but is not limited to, the content shown in the following specific embodiments.

Specific Embodiment 1

In Specific Embodiment 1, the PSFCH resource set corresponding to the target uplink channel includes a first PSFCH resource, where the first PSFCH resource corresponds to a time domain position including a PSFCH resource.

Further, in Specific Embodiment 1, step 205 may be performed as the following content:

determining the first PSFCH resource in the PSFCH resource set corresponding to the target uplink channel as a PSFCH resource in the target PSFCH resource set.

It may be understood that the resource in the target PSFCH resource set may include only the first PSFCH resource corresponding to the time domain position actually including a PSFCH resource in the PSFCH resource set corresponding to the target uplink channel.

Specific Embodiment 2

In Specific Embodiment 2, the PSFCH resource set corresponding to the target uplink channel includes a second PSFCH resource, where the second PSFCH resource corresponds to a time domain position including no PSFCH resource.

Optionally, the second PSFCH resource may be referred to as a virtual PSFCH resource.

Further, in Specific Embodiment 2, step 205 may be performed as the following content:

determining the second PSFCH resource in the PSFCH resource set corresponding to the target uplink channel as a PSFCH resource in the target PSFCH resource set.

It may be understood that the resource in the target PSFCH resource set may also include only the second PSFCH resource corresponding to the time domain position including no PSFCH resource in the PSFCH resource set corresponding to the target uplink channel.

Specific Embodiment 3

In Specific Embodiment 3, the PSFCH resource set corresponding to the target uplink channel includes a first PSFCH resource and a second PSFCH resource. The first PSFCH resource corresponds to a time domain position including a PSFCH resource, and a second PSFCH resource corresponds to a time domain position including no PSFCH resource.

Further, in Specific Embodiment 3, step 205 may be performed as the following content:

determining the first PSFCH resource and the second PSFCH resource in the PSFCH resource set corresponding to the target uplink channel as PSFCH resources in the target PSFCH resource set.

It may be understood that the resources in the target PSFCH resource set may include the first PSFCH resource corresponding to the time domain position actually including a PSFCH resource and the second PSFCH resource corresponding to the time domain position including no PSFCH resource in the PSFCH resource set corresponding to the target uplink channel.

It can be learned from a combination of Specific Embodiment 2 and Specific Embodiment 3 that for a case in which a time domain position corresponding to the target time interval includes no PSFCH resource, the time domain position may belong to the target PSFCH resource set or may not belong to the target PSFCH resource set.

Optionally, in Specific Embodiment 2 and Specific Embodiment 3, step 101 may be performed as the following content:

determining all of SL HARQ feedback information corresponding to the second PSFCH resource in the target PSFCH resource set as one of acknowledgment ACK information or negative acknowledgment NACK information.

It may be understood that for one or more second PSFCH resources corresponding to a time domain position including no PSFCH resource, SL HARQ feedback information corresponding to the second PSFCH resources may be entirely determined as ACK information or may be entirely determined as NACK information, that is, values of SL HARQ feedback time domain bits corresponding to the second PSFCH resources are all set to a value corresponding to the ACK information (for example, "1") or are all set to a value (for example, "0") corresponding to the NACK information.

Optionally, in the method for determining SL feedback information in the embodiments of the present invention, step 101 may be performed as the following content:

determining the SL HARQ feedback information based on a first number of SL HARQ feedback time domain bits respectively corresponding to each PSFCH resource in the target PSFCH resource set.

It may be understood that the SL HARQ feedback information corresponding to the target PSFCH resource set may include values corresponding to the first number of SL HARQ feedback time domain bits respectively corresponding to all the PSFCH resources in the target PSFCH resource set.

Optionally, the first number may be determined based on different parameters. The parameter may include at least one of PSFCH density and a target sub-carrier spacing SCS. The target SCS includes at least one of an SL SCS or a Uu SCS. Further, a specific embodiment of a mode of determining the first number includes, but is not limited to, following content:

Specific Embodiment 1

In Specific Embodiment 1, the first number is related to PSFCH density.

The PSFCH density may also be referred to as a PSFCH period. The PSFCH density may be explained according to the SL SCS, but is not limited to the SL SCS, and refers to that one PSFCH resource appears every a specific number of time domain positions, where the specific number is a value of the PSFCH density. Optionally, the value of the PSFCH density may be set to 1, 2, or 4. For example, if N=4, an implementation is that there is a PSFCH resource every 4 sidelink slots. It should be noted that if N corresponds to the sidelink slot, a duration of an occasion corresponding to N sidelink slots may be greater than or equal to a duration corresponding to N physical slots. In this way, some time domain positions include a PSFCH resource and another sidelink channel resource, for example, at least one of a physical sidelink shared channel (PSSCH) resource or a physical sidelink control channel (PSCCH) resource. However, some time domain positions include only a PSSCH resource and/or a PSCCH resource but include no PSFCH resource.

Optionally, a value of the first number is equal to a value of the PSFCH density.

Specific Embodiment 2

In Specific Embodiment 2, the first number is related to the target sub-carrier spacing SCS.

Optionally, a value of the first number is equal to a value of the PSFCH density.

Optionally, in a case that the target SCS includes the SL SCS and the Uu SCS, a value of the first number is determined based on one of the following modes:

(1) The value of the first number=SL SCS/Uu SCS= $2^{\mu SL-\mu Uu}$. The value of $\mu$ is related to values of the corresponding SL SCS and Uu SCS. For example, for $\mu$ corresponding to the SL SCS, if SL SCS=30 KHz, $\mu=1$, that is, SL SCS=$15\times2^{\mu}$=$15\times2^{1}$=30 KHz. Similarly, if SL SCS=60 KHz, $\mu=2$, that is, SL SCS=$15\times2^{\mu}$=$15\times2^{2}$=60 KHz. Since $\mu$ corresponding to the Uu SCS is similar to $\mu$ corresponding to the SL SCS, details are not described again.

(2) The value of the first number=a value of PSFCH density×$\lceil$SL SCS/Uu SCS/the value of the PSFCH density$\rceil$=the value of the PSFCH density×$\lceil 2^{\mu SL-\mu Uu}$/the value of the PSFCH density$\rceil$. The operation symbol "$\lceil$ $\rceil$" represents rounding up, which may also be represented as ceiling.

(3) The value of the first number=the value of PSFCH density×$\lfloor$SL SCS/Uu SCS/the value of the PSFCH density$\rfloor$=the value of the PSFCH density×$\lfloor 2^{\mu SL-\mu Uu}$/the value of the PSFCH density$\rfloor$. The operation symbol "$\lfloor$ $\rfloor$" represents rounding down, which may also be represented as floor.

(4) The value of the first number=the value of PSFCH density×SL SCS/Uu SCS=the value of PSFCH density×$2^{\mu SL-\mu Uu}$.

It should be noted that in Specific Embodiment 2, any of the foregoing modes for determining a value of the first number is applicable to at least one of the following scenarios: (1) SL SCS=Uu SCS; (2) SL SCS<Uu SCS; or (3) SL SCS>Uu SCS. Examples are provided below:

Specific Example 1

In Specific Example 1, Uu SCS=SL SCS=30 KHz, referring to FIG. 3:

(1) Assuming that a target time interval {Y2}={1, 2, 4, 8}, K=2, and PFSCH density N=4, because there is a PSFCH occasion (that is, a PSFCH resource) at a position at which Y2={4, 8}, a time domain position corresponding to n–{4, 8} is a feedback window of a PUCCH (that is, the target uplink channel), or PSFCH occasions in time domain positions, a slot (n–4) and a slot (n–8), are PSFCH occasions associated with the PUCCH, and respectively correspond to N bits of SL HARQ feedback information, and a user feeds back 2×N=8 bits of SL HARQ feedback information. A slot n is a time domain position at which the PUCCH is located.

(2) Assuming that a target time interval {Y2}={1, 2, 4, 8}, K=2, and PFSCH density N=4, a time domain position corresponding to n–{1, 2, 4, 8} is a feedback window of the PUCCH, or PSFCH occasions in time domain positions, a slot (n–1), a slot (n–2), a slot (n–4), and a slot (n–8), are PSFCH occasions associated with the PUCCH, and respectively correspond to N bits of SL HARQ feedback information, and the user feeds back 4×N=16 bits of SL HARQ feedback information, where the slot (n–1) and the slot (n–2) each correspond to 4 bits of NACK information, and the slot (n–4) and the slot (n–8) each correspond to 4 bits of SL HARQ feedback information, which is determined by the user according to PSFCH receiving statuses at the slot (n–4) and the slot (n–8). A slot n is a time domain position at which the PUCCH is located.

Specific Example 2

In Specific Example 2, Uu SCS>SL SCS, for example, Uu SCS=30 KHz, and SL SCS=15 KHz, referring to FIG. 4:

(1) Assuming that a target time interval {Y2}={1, 2, 4, 8}, K=2, and PFSCH density N=4, because there is a PSFCH occasion (that is, a PSFCH resource) at a position at which Y2={8}, a time domain position corresponding to n–{8} is a feedback window of a PUCCH (that is, the target uplink channel), or a PSFCH occasion in a time domain position, a slot (n–8), is a PSFCH occasion associated with the PUCCH, and corresponds to N bits of SL HARQ feedback information, and a user feeds back 1×N=4 bits of SL HARQ feedback information. A slot n is a time domain position at which the PUCCH is located.

(2) Assuming that a target time interval {Y2}={1, 2, 4, 8}, K=2, and PFSCH density N=4, a time domain position corresponding to n–{1, 2, 4, 8} is a feedback window of the PUCCH, or PSFCH occasions in time domain positions, a slot (n–1), a slot (n–2), a slot (n–4), and a slot (n–8), are PSFCH occasions associated with the PUCCH, and respectively correspond to N bits of SL HARQ feedback information, and the user feeds back 4×N=16 bits of SL HARQ feedback information, where the slot (n–1), the slot (n–2), and the slot (n–4) each correspond to 4 bits of NACK information, and the slot (n–8) corresponds to 4 bits of SL HARQ feedback information, which is determined by the user according to a PSFCH receiving status at the slot (n–8). A slot n is a time domain position at which the PUCCH is located.

Specific Example 3

In Specific Example 3, Uu SCS<SL SCS, for example, Uu SCS=15 KHz, and SL SCS=30 KHz, referring to FIG. 5:

(1) The first number N1=a value of the PSFCH density× $\lceil$SL SCS/Uu SCS/the value of the PSFCH density$\rceil$=N× $\lceil 2^{\mu SL-\mu Uu}/N \rceil$. Assuming that a target time interval {Y2}={2}, K=2, and PFSCH density N=4, because there are 2 SL slots in a Uu slot corresponding to a slot (n–2), and an SL slot 4 includes a PSFCH, but an SL slot 5 does not include a PSFCH, the slot (n–2) correspond to N× $\lceil 2^{\mu SL-\mu Uu}/N \rceil$=4× $\lceil 2/4 \rceil$=4 bits of SL HARQ feedback information, and a user feeds back 1×N=4 of bits SL HARQ feedback information, where the 4 bits of SL HARQ feedback information is determined by the user according to a PSFCH receiving status at the SL slot 4. A slot n is a time domain position at which the PUCCH is located.

(2) The first number N1=the value of the PSFCH density× SL SCS/Uu SCS=N×2$^{\mu SL-\mu Uu}$. Assuming that a target time interval {Y2}={2}, K=2, and PFSCH density N=4, because there are 2 SL slots in a Uu slot corresponding to a slot (n–2), and an SL slot 4 includes a PSFCH, but an SL slot 5 does not include a PSFCH, the slot (n–2) corresponds N×2$^{\mu SL-\mu Uu}$=4×2=8 bits of SL HARQ feedback information, where 2 SL slots each correspond to 4 bits of SL HARQ feedback information, 4 bits of SL HARQ feedback information corresponding to the slot 4 is determined by the user according to a PSFCH receiving status at the SL slot 4, and the slot 5 corresponds to 4 bits of NACK information. A slot n is a time domain position at which the PUCCH is located.

(3) The first number N1=the value N of the PSFCH density. Assuming that a target time interval {Y2}={2}, K=2, and PFSCH density N=4, because there are 2 SL slots in a Uu slot corresponding to a slot (n–2), and an SL slot 4 includes a PSFCH, but an SL slot 5 does not include a PSFCH, the slot (n–2) correspond to N=4 bits of SL HARQ feedback information, where 2 SL slots each correspond to 4 bits of SL HARQ feedback information, the 4 bits of SL HARQ feedback information is determined by the user according to a PSFCH receiving status at the SL slot 4. A slot n is a time domain position at which the PUCCH is located.

Specific Example 4

In Specific Example 4, Uu SCS<SL SCS, for example, Uu SCS=15 KHz, and SL SCS=60 KHz, referring to FIG. 6:

(1) The first number N1=SL SCS/Uu SCS=2$^{\mu L-\mu Uu}$. Assuming that a target time interval {Y2}={1, 2}, K=2, and PFSCH density N=2, because there are 4 SL slots in a Uu slot corresponding to a slot (n–2), and SL slots 8 and 10 include a PSFCH, but SL slots 9 and 11 do not include a PSFCH, the SL slots 8 and 10 in the slot (n–2) correspond to 2$^{\mu SL-\mu Uu}$=4/1=4 bits of SL HARQ feedback information. The SL slots 8 and 10 each correspond to 2 bits of SL HARQ feedback information, which is specifically determined by the user according to PSFCH receiving statuses at the SL slots 8 and 10. A slot n is a time domain position at which the PUCCH is located.

(2) The first number N1=a value of the PSFCH density× $\lceil$SL SCS/Uu SCS/the value of the PSFCH density$\rceil$=N× $\lceil 2^{\mu SL-\mu Uu}/N \rceil$. Assuming that a target time interval {Y2}={1, 2}, K=2, and PFSCH density N=2, because there are 4 SL slots in a Uu slot corresponding to a slot (n–2), and SL slots 8 and 10 include a PSFCH, but SL slots 9 and 11 do not include a PSFCH, the SL slots 8 and 10 in the slot (n–2) correspond to N× $\lceil 2^{\mu SL-\mu Uu}/N \rceil$=2× $\lceil 4/2 \rceil$=4 bits of SL HARQ feedback information. The SL slots 8 and 10 each correspond to 2 bits of SL HARQ feedback information, which is specifically determined by the user according to PSFCH receiving statuses at the SL slots 8 and 10. A slot n is a time domain position at which the PUCCH is located.

(3) The first number $N1$=the value of the PSFCH density× SL SCS/Uu SCS=$N×2^{\mu SL-\mu Uu}$. Assuming that a target time interval $\{Y2\}=\{1, 2\}$, K=2, and PFSCH density N=2, because there are 4 SL slots in a Uu slot corresponding to a slot (n−2), and SL slots 8 and 10 include a PSFCH, but SL slots 9 and 11 do not include a PSFCH, the slot (n−2) corresponds to $N×2^{\mu SL-\mu Uu}$=2× 4=8 bits of SL HARQ feedback information, where each SL slot corresponds to 2 bits of SL HARQ feedback information. The SL slots 8 and 10 each correspond to 2 bits of SL HARQ feedback information, which is specifically determined by the user according to PSFCH receiving statuses at the SL slots 8 and 10. SL slots 2 and 4 each correspond to 2 bits of NACK information.

A parameter K in any of the foregoing specific examples is described below: the PSFCH density is N, that is, the PSFCH occasion appears once ever N slots, where N=1, 2, 4. Optionally, in an implementation, in each PSFCH period, there are N possible PSSCH occasions associated with the PSFCH occasion, and a time of a PSSCH occasion associated with a slot m is not earlier than m+K, where K=2, 3, and the slot m is a time domain position at which the PSFCH occasion is located.

Optionally, in the method for determining SL feedback information provided in the embodiments of the present invention, in addition to adopting at least one of the foregoing modes to determine the first number, a mode of presetting a fixed value for the first number may also be adopted. Certainly, another mode may also be adopted, and includes, but is not limited to the foregoing content.

Optionally, in the method for determining SL feedback information in the embodiments of the present invention, step 101 may be performed as the following content:

determining the SL HARQ feedback information based on a second number of first sidelink channel resources respectively corresponding to each PSFCH resource in the target PSFCH resource set, where the first sidelink channel resource includes at least one of a physical sidelink shared channel PSSCH resource or a physical sidelink control channel PSCCH resource.

It may be understood that the SL HARQ feedback information corresponding to the target PSFCH resource set may be determined based on the second number of first sidelink channel resources respectively corresponding to all the PSFCH resources in the target PSFCH resource set. The first sidelink channel resource includes at least one of a PSSCH resource or a PSCCH resource.

Optionally, the number of SL HARQ feedback time domain bits respectively corresponding to each PSFCH resource in the target PSFCH resource set may be derived based on a second number of first sidelink channel resources respectively corresponding to the each PSFCH resource in the target PSFCH resource set, and further, the SL HARQ feedback information may be determined based on values corresponding to SL HARQ feedback time domain bits respectively corresponding to the each PSFCH resource in the target PSFCH resource set.

Optionally, the second number may be determined based on different parameters. The parameter may include at least one of PSFCH density and a target sub-carrier spacing SCS. The target SCS includes at least one of a sidelink sub-carrier spacing SL SCS or an air interface sub-carrier spacing Uu SCS. Further, a specific embodiment of a mode of determining the second number includes, but is not limited, to following content:

Specific Embodiment 1

In Specific Embodiment 1, the second number is related to PSFCH density.

The PSFCH density may also be referred to as a PSFCH period. The PSFCH density may be explained according to the SL SCS, and refers to that one PSFCH resource appears every a specific number of time domain positions, where the specific number is a value of the PSFCH density. Optionally, the value of the PSFCH density may be set to 1, 2, or 4. For example, if N=4, an implementation is that there is a PSFCH resource every 4 sidelink slots. It should be noted that if N corresponds to the sidelink slot, a duration of an occasion corresponding to N sidelink slots may be greater than or equal to a duration corresponding to N physical slots. In this way, some time domain positions include a PSFCH resource and another sidelink channel resource, for example, at least one of a PSSCH resource or a PSCCH resource. However, some time domain positions include only a PSSCH resource and/or a PSCCH resource but include no PSFCH resource.

Optionally, a value of the second number is equal to a value of the PSFCH density.

Specific Embodiment 2

In Specific Embodiment 2, the second number is related to the target sub-carrier spacing SCS.

Optionally, a value of the second number is equal to a value of the PSFCH density.

Optionally, in a case that the target SCS includes the SL SCS and the Uu SCS, a value of the second number is determined based on one of the following modes:

(1) The value of the second number=SL SCS/Uu SCS=$2^{\mu SL-\mu Uu}$.

(2) The value of the second number=a value of PSFCH density×$\lceil$SL SCS/Uu SCS/the value of the PSFCH density$\rceil$=the value of the PSFCH density×$\lceil 2^{\mu SL-\mu Uu}$/the value of the PSFCH density$\rceil$. The operation symbol "$\lceil$ $\rceil$" represents rounding up, which may also be represented as ceiling.

(3) The value of the second number=a value of PSFCH density×$\lfloor$SL SCS/Uu SCS/the value of the PSFCH density$\rfloor$=the value of the PSFCH density×$\lfloor 2^{\mu SL-\mu Uu}$/the value of the PSFCH density$\rfloor$. The operation symbol "$\lfloor$ $\rfloor$" represents rounding down, which may also be represented as floor.

(4) The value of the second number=the value of PSFCH density×SL SCS/Uu SCS=the value of PSFCH density×$2^{\mu SL-\mu Uu}$.

It should be noted that in Specific Embodiment 2, any of the foregoing modes for determining a value of the second number is applicable to at least one of the following scenarios: (1) SL SCS=Uu SCS; (2) SL SCS<Uu SCS; or (3) SL SCS>Uu SCS. Examples are provided below:

Specific Example 1

In Specific Example 1, Uu SCS=SL SCS=30 KHz, referring to FIG. 3:

(1) Assuming that a target time interval $\{Y2\}=\{1, 2, 4, 8\}$, K=2, and PFSCH density N=4, because there is a PSFCH occasion (that is, a PSFCH resource) at a position at which Y2=$\{4, 8\}$, a time domain position corresponding to n–{4, 8} is a feedback window of a PUCCH (that is, the target uplink channel), or PSFCH occasions in time domain positions, a slot (n–4) and a slot (n–8), are PSFCH occasions associated with the PUCCH, and respectively correspond to N bits of SL HARQ feedback information, and a user feeds back 2×N=8 bits of SL HARQ feedback information. A slot n is a time domain position at which the PUCCH is located.

(2) Assuming that a target time interval {Y2}={1, 2, 4, 8}, K=2, and PFSCH density N=4, a time domain position corresponding to n–{1, 2, 4, 8} is a feedback window of the PUCCH, or PSFCH occasions in time domain positions, a slot (n–1), a slot (n–2), a slot (n–4), and a slot (n–8), are PSFCH occasions associated with the PUCCH, and respectively correspond to N bits of SL HARQ feedback information, and the user feeds back 4×N=16 bits of SL HARQ feedback information, where the slot (n–1) and the slot (n–2) each correspond to 4 bits of NACK information, and the slot (n–4) and the slot (n–8) each correspond to 4 bits of SL HARQ feedback information, which is determined by the user according to PSFCH receiving statuses at the slot (n–4) and the slot (n–8). A slot n is a time domain position at which the PUCCH is located.

Specific Example 2

In Specific Example 2, Uu SCS>SL SCS, for example, Uu SCS=30 KHz, and SL SCS=15 KHz, referring to FIG. 4:

(1) Assuming that a target time interval {Y2}={1, 2, 4, 8}, K=2, and PFSCH density N=4, because there is a PSFCH occasion (that is, a PSFCH resource) at a position at which Y2={8}, a time domain position corresponding to n–{8} is a feedback window of a PUCCH (that is, the target uplink channel), or a PSFCH occasion in a time domain position, a slot (n–8), is a PSFCH occasion associated with the PUCCH, and corresponds to N bits of SL HARQ feedback information, and a user feeds back 1×N=4 bits of SL HARQ feedback information. A slot n is a time domain position at which the PUCCH is located.

(2) Assuming that a target time interval {Y2}={1, 2, 4, 8}, K=2, and PFSCH density N=4, a time domain position corresponding to n–{1, 2, 4, 8} is a feedback window of the PUCCH, or PSFCH occasions in time domain positions, a slot (n–1), a slot (n–2), a slot (n–4), and a slot (n–8), are PSFCH occasions associated with the PUCCH, and respectively correspond to N bits of SL HARQ feedback information, and the user feeds back 4×N=16 bits of SL HARQ feedback information, where the slot (n–1), the slot (n–2), and the slot (n–4) each correspond to 4 bits of NACK information, and the slot (n–8) corresponds to 4 bits of SL HARQ feedback information, which is determined by the user according to a PSFCH receiving status at the slot (n–8). A slot n is a time domain position at which the PUCCH is located.

Specific Example 3

In Specific Example 3, Uu SCS<SL SCS, for example, Uu SCS=15 KHz, and SL SCS=30 KHz, referring to FIG. 5:

(1) The second number N2=a value of the PSFCH density×⌈SL SCS/Uu SCS/the value of the PSFCH density⌉=N×⌈$2^{\mu SL-\mu Uu}$/N⌉. Assuming that a target time interval {Y2}={2}, K=2, and PFSCH density N=4, because there are 2 SL slots in a Uu slot corresponding to a slot (n–2), and an SL slot 4 includes a PSFCH, but an SL slot 5 does not include a PSFCH, the slot (n–2) correspond to N×2⌈$^{\mu SL-\mu Uu}$/N⌉=4×⌈2/4⌉=4 bits of SL HARQ feedback information, and a user feeds back 1×N=4 of bits SL HARQ feedback information, where the 4 bits of SL HARQ feedback information is determined by the user according to a PSFCH receiving status at the SL slot 4. A slot n is a time domain position at which the PUCCH is located.

(2) The second number N2=the value of the PSFCH density×SL SCS/Uu SCS=N×$2^{\mu SL-\mu Uu}$. Assuming that a target time interval {Y2}={2}, K=2, and PFSCH density N=4, because there are 2 SL slots in a Uu slot corresponding to a slot (n–2), and an SL slot 4 includes a PSFCH, but an SL slot 5 does not include a PSFCH, the slot (n–2) corresponds N×$2^{\mu SL-\mu Uu}$32 4×2=8 bits of SL HARQ feedback information, where 2 SL slots each correspond to 4 bits of SL HARQ feedback information, 4 bits of SL HARQ feedback information corresponding to the slot 4 is determined by the user according to a PSFCH receiving status at the SL slot 4, and the slot 5 corresponds to 4 bits of NACK information. A slot n is a time domain position at which the PUCCH is located.

(3) The second number N2=the value N of the PSFCH density. Assuming that a target time interval {Y2}={2}, K=2, and PFSCH density N=4, because there are 2 SL slots in a Uu slot corresponding to a slot (n–2), and an SL slot 4 includes a PSFCH, but an SL slot 5 does not include a PSFCH, the slot (n–2) correspond to N=4 bits of SL HARQ feedback information, where 2 SL slots each correspond to 4 bits of SL HARQ feedback information, the 4 bits of SL HARQ feedback information is determined by the user according to a PSFCH receiving status at the SL slot 4. A slot n is a time domain position at which the PUCCH is located.

Specific Example 4

In Specific Example 4, Uu SCS<SL SCS, for example, Uu SCS=15 KHz, and SL SCS=60 KHz, referring to FIG. 6:

(1) The second number N2=SL SCS/Uu SCS=$2^{\mu SL-\mu Uu}$. Assuming that a target time interval {Y2}={1, 2}, K=2, and PFSCH density N=2, because there are 4 SL slots in a Uu slot corresponding to a slot (n–2), and SL slots 8 and 10 include a PSFCH, but SL slots 9 and 11 do not include a PSFCH, the SL slots 8 and 10 in the slot (n–2) correspond to $2^{82}$ $^{SL-\mu Uu}$=4/1=4 bits of SL HARQ feedback information. The SL slots 8 and 10 each correspond to 2 bits of SL HARQ feedback information, which is specifically determined by the user according to PSFCH receiving statuses at the SL slots 8 and 10. A slot n is a time domain position at which the PUCCH is located.

(2) The second number N2=a value of the PSFCH density×⌈SL SCS/Uu SCS/the value of the PSFCH density⌉=N×⌈$2^{\mu SL-\mu Uu}$/N⌉. Assuming that a target time interval {Y2}={1, 2}, K=2, and PFSCH density N=2, because there are 4 SL slots in a Uu slot corresponding to a slot (n–2), and SL slots 8 and 10 include a PSFCH, but SL slots 9 and 11 do not include a PSFCH, the SL slots 8 and 10 in the slot (n–2) correspond to N×⌈$2^{\mu SL-\mu Uu}$/N⌉=2×⌈4/2⌉=4 bits of SL HARQ feedback information. The SL slots 8 and 10 each correspond to 2 bits of SL HARQ feedback information, which is specifically determined by the user according to PSFCH receiving statuses at the SL slots 8 and 10. A slot n is a time domain position at which the PUCCH is located.

(3) The second number N2=the value of the PSFCH density×SL SCS/Uu SCS=N×$2^{\mu SL-\mu Uu}$. Assuming that a target time interval {Y2}={1, 2}, K=2, and PFSCH density N=2, because there are 4 SL slots in a Uu slot corresponding to a slot (n–2), and SL slots 8 and 10 include a PSFCH, but SL slots 9 and 11 do not include a PSFCH, the slot (n–2) corresponds to N×b $2^{\mu SL-\mu Uu}$=2×4=8 bits of SL HARQ feedback information, where each SL slot corresponds to 2 bits of SL HARQ feedback information. The SL slots 8 and 10 each correspond to 2 bits of SL HARQ feedback information, which is specifically determined by the user according to PSFCH receiving statuses at the SL slots 8 and 10. SL slots 2 and 4 each correspond to 2 bits of NACK information.

A parameter K in any of the foregoing specific examples is described below: the PSFCH density is N, that is, the PSFCH occasion appears once ever N slots, where N=1, 2, 4. Optionally, in an implementation, in each PSFCH period, there are N possible PSSCH occasions associated with the PSFCH occasion, and a time of a PSSCH occasion associated with a slot m is not earlier than m+K, where K=2, 3, and the slot m is a time domain position at which the PSFCH occasion is located.

Optionally, in the method for determining SL feedback information provided in the embodiments of the present invention, in addition to adopting at least one of the foregoing modes to determine the second number, a mode of presetting a fixed value for the second number may also be adopted. Certainly, another mode may also be adopted, and includes, but is not limited to the foregoing content.

Optionally, in the method for determining SL feedback information provided in the embodiments of the present invention, the step of determining the SL HARQ feedback information based on a second number of first sidelink channel resources respectively corresponding to each PSFCH resource in the target PSFCH resource set may be implemented based on different solutions, which include, but are not limited to, the content disclosed in the following specific embodiments.

Specific Embodiment 1

In Specific Embodiment 1, the step of determining the SL HARQ feedback information based on a second number of first sidelink channel resources respectively corresponding to each PSFCH resource in the target PSFCH resource set may be performed as the following content:

setting, if the first sidelink channel resources are used for transmission of a corresponding first sidelink channel, the SL HARQ feedback time domain bits corresponding to the first sidelink channel resources to a decoding state or an SL HARQ feedback state corresponding to the first sidelink channel.

Optionally, first signaling corresponding to the first sidelink channel indicates that the target uplink channel is used for transmission of the SL HARQ feedback information, where the first signaling may include control signaling (for example, DCI or SCI) or configuration signaling.

The decoding state includes a decoding success or a decoding failure, and the SL HARQ feedback state includes an ACK state or a NACK state. In a case of a decoding success or an ACK state, a value of an SL HARQ feedback time domain bit corresponding to the first sidelink channel resource may be set to "1". In a case of a decoding failure or a NACK state, a value of an SL HARQ feedback time domain bit corresponding to the first sidelink channel resource may be set to "0". Optionally, there may be one or more SL HARQ feedback time domain bits. Further, in a case of discontinuous transmission (DTX), a value of an SL HARQ feedback time domain bit value corresponding to the first sidelink channel resource is set to DTX, NACK, or ACK.

Specific Embodiment 2

In Specific Embodiment 2, the step of determining the SL HARQ feedback information based on a second number of first sidelink channel resources respectively corresponding to each PSFCH resource in the target PSFCH resource set may be performed as the following content:

setting, in a case that a first preset condition is satisfied, all the SL HARQ feedback time domain bits corresponding to the first sidelink channel resources to ACK information.

The first preset condition includes one of the following:

(1) The first sidelink channel resource is used for transmission of a broadcast message.

(2) Sidelink control information SCI corresponding to the first sidelink channel indicates that no SL HARQ feedback information is fed back, where transmission of the first sidelink channel is performed through the corresponding first sidelink channel resource, and the first sidelink channel includes at least one of a PSSCH or a PSCCH.

(3) It is configured by a network device or pre-configured that no SL HARQ feedback information is fed back.

(4) SL HARQ feedback is disabled. Optionally, higher layer signaling indicates that SL HARQ feedback is disabled.

(5) A multicast option-1 mode is used for HARQ feedback, and NACK information corresponding to the first sidelink channel resource is not received. Optionally, it is configured or indicated by a network device or pre-configured that a multicast option-1 mode is adopted.

(6) The first sidelink channel resource is a resource for a configured grant but is not used.

Specific Embodiment 3

In Specific Embodiment 3, the step of determining the SL HARQ feedback information based on a second number of first sidelink channel resources respectively corresponding to each PSFCH resource in the target PSFCH resource set may be performed as the following content:

setting, in a case that a second preset condition is satisfied, all the SL HARQ feedback time domain bits corresponding to the first sidelink channel resources to NACK information.

The second preset condition includes one of the following:

(1) No SL HARQ feedback information corresponding to the first sidelink channel resource is received.

(2) No PSFCH corresponding to the first sidelink channel resource is received.

(3) No second signaling used for scheduling the first sidelink channel resource is detected. The second signaling may include control signaling (for example, DCI or SCI).

(4) The first sidelink channel resources are not used for transmission of the corresponding first sidelink channel.

(5) The first sidelink channel resources are preempted.

(6) Transmission corresponding to the first sidelink channel resources is dropped, abandoned, or canceled.

(7) The first sidelink channel resources are used for transmission of the corresponding first sidelink channel, and third signaling corresponding to the first sidelink channel indicates performing SL HARQ feedback on an uplink channel corresponding to a time domain position other than a target time domain position. That is, the uplink channels corresponding to the other time domain positions are different from the target uplink channel. The third signaling includes control signaling (for example, DCI or SCI) or higher layer signaling. The higher layer signaling includes at least one of RRC signaling, Packet Data Convergence Protocol (PDCP) signaling, Service Data Adaptation Protocol (SDAP) signaling, Radio Link Control (RLC) signaling, Medium Access Control (MAC) signaling, or the like.

Specific Embodiment 4

In Specific Embodiment 4, in a case that a third number of first sidelink channel resources in the second number of first sidelink channel resources are used for transmission of a same transport block TB or PSSCH repetition, the step of determining the SL HARQ feedback information based on a second number of first sidelink channel resources respectively corresponding to each PSFCH resource in the target PSFCH resource set may be performed as one of the following content:

(1) Set SL HARQ feedback time domain bits corresponding to each of the third number of first sidelink channel resources to a decoding state or an SL HARQ feedback state corresponding to a first sidelink channel corresponding to the each of the third number of first sidelink channel resources respectively.

(2) Set, for a fourth number of first sidelink channel resources in the third number of first sidelink channel resources, SL HARQ feedback time domain bits corresponding to each of the fourth number of first sidelink channel resources to a decoding state or an SL HARQ feedback state corresponding to a first sidelink channel corresponding to the each of the fourth number of first sidelink channel resources respectively.

(3) Set, for other first sidelink channel resources than the fourth number of first sidelink channel resources in the third number of first sidelink channel resources, all SL HARQ feedback time domain bits corresponding to each of the other first sidelink channel resources to one of ACK information or NACK information.

(4) Set the SL HARQ feedback time domain bits corresponding to the each of the fourth number of first sidelink channel resources to the decoding state or the SL HARQ feedback state corresponding to the first sidelink channel corresponding to the each of the fourth number of the first sidelink channel resources respectively, and setting all the SL HARQ feedback time domain bits corresponding to the each of the other first sidelink channel resources to one of the ACK information or the NACK information.

Optionally, a value of the fourth number in (2) to (4) may be set to 1.

Optionally, the fourth number of first sidelink channel resources in (2) to (4) are one or more first sidelink channel resources having time domain positions arranged at a preset position (for example, the last position) in the third number of first sidelink channel resources.

(5) Set the SL HARQ feedback time domain bits corresponding to the each of the third number of first sidelink channel resources to a decoding state or an SL HARQ feedback state corresponding to a first sidelink channel corresponding to a resource at a preset position in the third number of first sidelink channel resources respectively.

Optionally, the preset position may be last one or more positions at which time domain positions in the third number of first sidelink channel resources are arranged.

For example, the SL HARQ feedback time domain bits corresponding to all the first sidelink channel resources in the third number of first sidelink channel resources are set to a decoding state or an SL HARQ feedback state corresponding to a first sidelink channel corresponding to the last first sidelink channel resource in the third number of first sidelink channel resources.

Optionally, in another specific embodiment of the method for determining SL feedback information provided in the embodiments of the present invention, the target PSFCH resource set associated with the target uplink channel is determined based on at least one of a first feedback time or a second feedback time.

That is, in the method for determining SL feedback information provided in the embodiments of the present invention, in addition to the mode of determining the target PSFCH resource set corresponding to FIG. 2, the target PSFCH resource set may also be determined based on at least one of the first feedback time or the second feedback time. Further, the SL HARQ feedback information may be determined based on the target PSFCH resource set.

Optionally, the first feedback time and the second feedback time may be respectively determined based on at least one of the following modes: being configured by a control node; being pre-configured; being indicated by a network device; being defined in a protocol; or being indicated by another terminal device. That is, values of different parameters may be determined respectively in a same mode or different modes.

Optionally, in the method for determining SL feedback information provided in the embodiments of the present invention, a process of determining the target PSFCH resource set based on at least one of the first feedback time or the second feedback time may be performed as the following different specific embodiments:

Specific Embodiment 1

In Specific Embodiment 1, the target PSFCH resource set associated with the target uplink channel is determined according to a resource position at which the target uplink channel is located and the first feedback time.

For example, in a case that the resource position at which the target uplink channel is located is a slot n, and the first feedback time is T, SL HARQ feedback information that needs to be fed back may be determined based on a slot corresponding to n–T.

Specific Embodiment 2

In Specific Embodiment 2, a feedback time period is determined according to a resource position at which the target uplink channel is located, the first feedback time, and the second feedback time, and the target PSFCH resource set associated with the target uplink channel is determined according to the feedback time period.

Optionally, in Specific Embodiment 2, each target time in the feedback time period corresponds to at least one SL HARQ feedback time domain bit.

For example, in a case that the resource position at which the target uplink channel is located is a slot n, the first feedback time is T, and the second feedback time is L, SL HARQ feedback information that needs to be fed back is determined based on a feedback time period not later than a slot (n–T). Each slot in the feedback time period corresponds to a specific number of SL HARQ feedback time domain bits. Specifically, if T=1, and L=6, each slot in a feedback time period of from a slot (n–6) to a slot (n–1) corresponds to a specific number of bits.

Optionally, in the method for determining SL feedback information provided in the embodiments of the present invention, the target time includes resources in the target PSFCH resource set.

Continuing from the foregoing example, each slot including a PSFCH occasion (that is, a resource in the target PSFCH resource set) in the above feedback time period corresponds to a specific number of SL HARQ feedback time domain bits. Specifically, if T=1, and L=6, at least one slot in a feedback time period of from the slot (n–6) to the slot (n–1) includes a PSFCH occasion and corresponds to a specific number of bits.

Optionally, a time domain position corresponding to the target time interval may be located in the feedback time period. Continuing from the foregoing example, if T=1, L=6, and a set of values of a target time interval Y2 is {1, 4, 6, 8}, a slot (that is, a time domain position) corresponding to Y2={4, 6} is located in the feedback time period of from the slot (n–6) to the slot (n–1), and further, its corresponding PSFCH occasion belongs to the foregoing target PSFCH resource set.

Specific Embodiment 3

In Specific Embodiment 3, a feedback time period is determined according to a resource position at which the target uplink channel is located and the second feedback time, and the target PSFCH resource set associated with the target uplink channel is determined according to the feedback time period.

Optionally, in Specific Embodiment 3, each target time in the feedback time period corresponds to at least one SL HARQ feedback time domain bit. For example, each slot including a PSFCH occasion (that is, a resource in the target PSFCH resource set) in the above feedback time period corresponds to a specific number of SL HARQ feedback time domain bits.

Optionally, in the method for determining SL feedback information provided in the embodiments of the present invention, the target time includes resources in the target PSFCH resource set.

In view of the above, feedback information in a time domain dimension corresponding to the target PSFCH resource set can be determined through the foregoing content.

Optionally, in the method for determining SL feedback information provided in the embodiments of the present invention, each PSFCH resource in the target PSFCH resource set corresponds to a fifth number of SL HARQ feedback time domain bits.

It may be understood that for the SL HARQ feedback information that is in a frequency domain dimension and that corresponds to the target PSFCH resource set, each PSFCH resource in the target PSFCH resource set may correspond to a fifth number of SL HARQ feedback time domain bits.

Optionally, the fifth number includes at least one of the following:

(1) the number of corresponding (available) PSSCH resource blocks (RB) on each second sidelink channel resource, where the second sidelink channel resource includes at least one of a PSSCH resource or a PSCCH resource;

(2) the number of (available) sub-channels on each second sidelink channel resource;

(3) the corresponding maximum number of PSSCHs for transmission or demodulation on each second sidelink channel resource;

(4) the number of (available) PSSCH RBs or the number of sub-channels in at least one target frequency domain resource, where the target frequency domain resource includes a sub-channel, a resource pool, or a bandwidth part (BWP);

(5) the maximum number of pieces of sidelink control information SCI or the maximum number of PSCCH resources for transmission, blind detection, detection, or demodulation on each second sidelink channel resource, slot, or span;

(6) the number of pieces of (available) SCI or the number of PSCCH resources in at least one target frequency domain resource, where the target frequency domain resource includes a sub-channel, a resource pool, or a bandwidth part BWP;

(7) the maximum number of pieces of SCI or the maximum number of PSCCH resources in at least one target frequency domain resource;

(8) the number of pieces of (available) SCI or the number of PSCCH resources on each second sidelink channel resource, slot, or span;

(9) the maximum number of transmission PSFCH resources, which, optionally, includes the maximum number of receiving PSFCH resources or the maximum number of sending PSFCH resources;

(10) the maximum number of transmission PSFCH RBs, which, optionally, includes the maximum number of receiving PSFCH RBs or the maximum number of sending PSFCH RBs;

(11) the number of (available) PSFCH RBs in one resource pool, which may also be referred to as a number rbSetPSFCH of available PSFCH RBs in a resource pool (indicates the set of PRBs that are actually used for PSFCH transmission and reception);

(12) a maximum value (that is, a maximum value in rbSetPSFCH) in the numbers of (available) PSFCH RBs corresponding to at least two resource pools;

(13) the number of RBs in a sub-channel in one resource pool; (14) a maximum value in the numbers of RBs corresponding to sub-channels in at least two resource pools;

(15) the number of PSFCH RBs in a sub-channel in one resource pool; (16) a maximum value in the numbers of PSFCH RBs corresponding to sub-channels in at least two resource pools;

(17) the number of RBs included in the BWP;

(18) the number of PSFCH RBs included in the BWP; or

(19) the number of (available) PSFCH RBs corresponding to each second sidelink channel resource.

Optionally, in the method for determining SL feedback information provided in the embodiments of the present invention, the target time interval, the PSFCH density, the first number, the second number, the third number, the fourth number, and the fifth number are respectively determined based on at least one of the following modes: being configured by a control node; being pre-configured; being indicated by a network device; being agreed on in a protocol; or being indicated by another terminal device. That is, values of different parameters may be determined respectively in a same mode or different modes.

It should be noted that in the method for determining SL feedback information provided in the embodiments of the present invention, a sequence of determining feedback information in a time domain dimension corresponding to the target PSFCH resource set and determining feedback information in a frequency domain dimension corresponding to the target PSFCH resource set is not specifically defined, and any combination is possible.

Optionally, in the method for determining SL feedback information in the embodiments of the present invention, the SL corresponds to a sixth number of carriers.

It may be understood that for a carrier dimension, the SL in the embodiments of the present invention corresponds to a sixth number of carriers. Each carrier in the sixth number of carriers can be considered in the foregoing time domain dimension and frequency domain dimension, to implement the solution of determining sidelink hybrid automatic repeat request SL HARQ feedback information based on a target physical sidelink feedback channel PSFCH resource set associated with a target uplink channel.

Optionally, in the method for determining SL feedback information in the embodiments of the present invention, the number of PSFCH RBs associated with the terminal device is a seventh number.

Optionally, for a unicast scenario and a multicast option-1 scenario, a value of seventh number may be set to 1.

Optionally, for a multicast option-2 scenario, a value of seventh number may be set to 2.

Optionally, in the method for determining SL feedback information provided in the embodiments of the present invention, the sixth number and the seventh number may be respectively determined based on at least one of the following modes: being configured by a control node; being pre-configured; being indicated by a network device; being agreed on in a protocol; or being indicated by another terminal device. That is, values of different parameters may be determined respectively in a same mode or different modes.

Optionally, in the method for determining SL feedback information in the embodiments of the present invention, step 101 may be performed as the following content:

concatenating the SL HARQ feedback bits corresponding to the target PSFCH resource set according to at least one of a terminal device dimension, a carrier dimension, a time domain dimension, or a frequency domain dimension, to determine the SL HARQ feedback information.

It may be understood that when the SL HARQ feedback information is determined, the SL HARQ feedback bits corresponding to the target PSFCH resource set can be sorted and traversed (that is, concatenated) according to a specific sequence or rule, so that orderly and comprehensive mapping between the target PSFCH resource set and the SL HARQ feedback information can be accurately implemented.

For example, a target time interval {Y2} is first traversed, PSFCH occasions are sorted (for example, in descending order according to a value of Y2), and then, PSSCH occasions associated with each PSFCH occasion are stored (for example, according to a sidelink slot index in which the PSSCH occasions are located):

(1) In a case that there are PSFCH occasions on U Y2 values in {Y2}, and an SL codebook is related to only PSFCH density N and a time domain dimension, if one user on one PSSCH occasion can at most send M PSSCHs, corresponding SL HARQ feedback information occupies (U×N×M) bits.

(2) In a case that there are PSFCH occasions on U Y2 values in {Y2}, and an SL codebook is related to a time domain dimension, PSFCH density N, and a parameter Z (which indicates the number of (available) PSFCH RBs corresponding to PSSCH occasions corresponding to each PSFCH resource in the target PSFCH resource set, that is, a fifth number) in a frequency domain dimension, corresponding SL HARQ feedback information occupies (U×N×M×Z) bits.

(3) In a case that there are PSFCH occasions on U Y2 values in {Y2}, and an SL codebook is related to a time domain dimension, a parameter X (which indicates the maximum number of transmission PSFCH RBs corresponding to each PSFCH resource in the target PSFCH resource set, that is, a fifth number) in a frequency domain dimension, and a parameter P (which indicates the number of PSFCH RBs associated with a terminal device, that is, a seventh number) in a terminal device dimension, corresponding SL HARQ feedback information occupies (U×X/P) bits.

Optionally, the method for determining SL feedback information in the embodiments of the present invention may further include the following content:

A 1-bit downlink assignment indicator (DAI) in DCI indicates whether transmission of the SL HARQ feedback information can be performed on the PUSCH.

Optionally, in the method for determining SL feedback information in the embodiments of the present invention, the target uplink channel is associated with at least one target resource, where the target resource includes a resource pool, a sub-channel, a bandwidth part BWP, or a carrier.

It may be understood that resources in the target PSFCH resource set associated with the target uplink channel may belong to a same target resource, or may belong to a same set of target resources, and may be associated with any target resource. That is, the target uplink channel may feed back only SL HARQ feedback information corresponding to PSFCH resources or PSSCH resources in a specified target resource, or may feed back SL HARQ feedback information corresponding to PSFCH resources or PSSCH resources in some specified target resources, or may feed back SL HARQ feedback information corresponding to PSFCH resources or PSSCH resources in any target resource.

Optionally, a mode in which the target uplink channel is associated with the at least one target resource includes at least one of the following:

(1) The target uplink channel is associated with one or more target resources in the at least one target resource.

Optionally, the target uplink channel is associated with an identifier or identifiers (ID) of one or more target resources in the at least one target resource. The IDs of the target resources may be indicated by control signaling or higher layer signaling. The higher layer signaling includes at least one of RRC signaling, Packet Data Convergence Protocol (PDCP) signaling, Service Data Adaptation Protocol (SDAP) signaling, Radio Link Control (RLC) signaling, Medium Access Control (MAC) signaling, or the like.

(2) A resource set of the target uplink channel is associated with an ID or IDs of one or more target resources in the at least one target resource.

Optionally, the resource set of the target uplink channel is associated with an ID or IDs of one or more target resources in the at least one target resource.

(3) A format of the target uplink channel is associated with one or more target resources in the at least one target resource.

Optionally, the format of the target uplink channel is associated with an ID or IDs of one or more target resources in the at least one target resource.

(4) A sequence of the target uplink channel is associated with one or more target resources in the at least one target resource;

Optionally, the sequence of the target uplink channel is associated with an ID or IDs of one or more target resources in the at least one target resource. The sequence of the target uplink channel includes at least one of a base sequence, initialization, a cyclic shift, phase rotation, or the like.

(5) A frequency domain resource of the target uplink channel is associated with one or more target resources in the at least one target resource.

Optionally, the frequency domain resource of the target uplink channel is associated with an ID or IDs of one or more target resources in the at least one target resource.

(6) A time domain resource of the target uplink channel is associated with one or more target resources in the at least one target resource.

Optionally, the time domain resource of the target uplink channel is associated with an ID or IDs of one or more target resources in the at least one target resource.

(7) A frequency hopping pattern of the target uplink channel is associated with one or more target resources in the at least one target resource.

Optionally, the frequency hopping pattern of the target uplink channel is associated with an ID or IDs of one or more target resources in the at least one target resource. The frequency hopping pattern is used for the communication device to perform frequency hopping.

Optionally, the target uplink channel is associated with a target sidelink channel resource. The target sidelink channel resource includes at least one of a PSFCH resource, a PSSCH resource, or a PSCCH resource.

Optionally, in a specific example, the target sidelink channel resource includes at least one resource outside a sidelink channel resource range corresponding to the at least one target resource.

Optionally, in a specific example, all of SL HARQ feedback information corresponding to the at least one resource outside the sidelink channel resource range corresponding to the at least one target resource is one of acknowledgment ACK information or negative acknowledgment NACK information.

For example, in an example, one PUCCH is associated with a resource pool #1, and the PUCCH is associated with 4 PSFCH occasions #1, #2, #3, and #4. If the occasion #3 in the 4 PSFCH occasions belongs to a resource pool #2, and the other three belongs to the resource pool #1, when the PUCCH feeds back HARQ-ACK bit(s) of the 4 PSFCH occasions, HARQ-ACK bit(s) corresponding to the occasion #3 is or are all set to ACK information.

In another example, one PUCCH is associated with a resource pool #1, and the PUCCH is associated with 4 PSFCH occasions #1, #2, #3, and #4. If the occasion #3 in the 4 PSFCH occasions belongs to a resource pool #2, and the other three belongs to the resource pool #1, when the PUCCH feeds back HARQ-ACK bit(s) of the 4 PSFCH occasions, HARQ-ACK bit(s) corresponding to the occasion #3 is or are all set to NACK information.

Further, optionally, a resource in the target PSFCH resource set associated with the foregoing target uplink channel may include at least one resource outside a sidelink channel resource range corresponding to the at least one target resource.

It may be understood that a resource that does not belong to a sidelink channel resource range corresponding to the at least one target resource associated with the target uplink channel (that is, the at least one resource outside a sidelink channel resource range corresponding to the at least one target resource) may be a resource in a target PSFCH resource set associated with the target uplink channel.

Optionally, in another specific example, the target sidelink channel resource is a resource in a sidelink channel resource range corresponding to the at least one target resource.

Further, optionally, a resource in the target PSFCH resource set associated with the foregoing target uplink channel may be at least one resource in a sidelink channel resource range corresponding to the at least one target resource.

It may be understood that a resource that does not belong to a sidelink channel resource range corresponding to the at least one target resource associated with the target uplink channel (that is, the at least one resource outside a sidelink channel resource range corresponding to the at least one target resource) is not a resource in a target PSFCH resource set associated with the target uplink channel either.

Optionally, in the method for determining SL feedback information in the embodiments of the present invention, target sidelink channel resources associated with the target uplink channel are grouped according to the target resource. For example, resources associated with each target resource or corresponding SL HARQ-ACK bit(s) may be sequentially concatenated according to an ID of the target resource.

Referring to FIG. 7, the embodiments of the present invention provide a communication device 300. The communication device 300 may be a network device or a terminal device, and may include:

a determining module 301, configured to determine sidelink hybrid automatic repeat request SL HARQ feedback information based on a target physical sidelink feedback channel PSFCH resource set associated with a target uplink channel, where the target PSFCH resource set is determined based on a target time interval, where the target time interval is a spacing between the target uplink channel and a PSFCH.

Optionally, in the communication device 300 provided in the embodiments of the present invention, the determining module 301 may be configured to:

determine the SL HARQ feedback information based on a first number of SL HARQ feedback time domain bits respectively corresponding to each PSFCH resource in the target PSFCH resource set.

Optionally, in the communication device 300 provided in the embodiments of the present invention, the first number is related to PSFCH density.

Optionally, in the communication device 300 provided in the embodiments of the present invention, a value of the first number is equal to a value of the PSFCH density.

Optionally, in the communication device 300 provided in the embodiments of the present invention, the first number is related to a target sub-carrier spacing SCS, where the target SCS includes at least one of a sidelink sub-carrier spacing SL SCS or an air interface sub-carrier spacing Uu SCS.

Optionally, in the communication device 300 provided in the embodiments of the present invention, in a case that the target SCS includes the SL SCS and the Uu SCS, a value of the first number is determined based on one of the following modes:

the value of the first number=SL SCS/Uu SCS; the value of the first number=a value of the PSFCH density×⌈SL SCS/Uu SCS/the value of the PSFCH density⌉; the value of the first number=the value of the PSFCH density×⌈SL SCS/Uu SCS/the value of the PSFCH density⌉; or the value of the first number=the value of the PSFCH density×SL SCS/Uu SCS.

Optionally, in the communication device 300 provided in the embodiments of the present invention, the determining module 301 may be configured to:

determine a time domain position corresponding to the target time interval; and determine, according to the time domain positions, a PSFCH resource set corresponding to the target uplink channel.

Optionally, in the communication device 300 provided in the embodiments of the present invention, the determining module 301 may be configured to:

determine the target PSFCH resource set based on the PSFCH resource set corresponding to the target uplink channel, where the target PSFCH resource set is a subset of the PSFCH resource set corresponding to the target uplink channel.

Optionally, in the communication device 300 provided in the embodiments of the present invention, the PSFCH resource set corresponding to the target uplink channel includes a first PSFCH resource, where the first PSFCH resource corresponds to a time domain position including a PSFCH resource.

Optionally, in the communication device 300 provided in the embodiments of the present invention, the determining module 301 may be configured to:

determine the first PSFCH resource in the PSFCH resource set corresponding to the target uplink channel as a PSFCH resource in the target PSFCH resource set.

Optionally, in the communication device 300 provided in the embodiments of the present invention, the PSFCH resource set corresponding to the target uplink channel includes a second PSFCH resource, where the second PSFCH resource corresponds to a time domain position including no PSFCH resource.

Optionally, in the communication device 300 provided in the embodiments of the present invention, the determining module 301 may be configured to:

determine the second PSFCH resource in the PSFCH resource set corresponding to the target uplink channel as a PSFCH resource in the target PSFCH resource set.

Optionally, in the communication device 300 provided in the embodiments of the present invention, the determining module 301 may be configured to:

determine all of SL HARQ feedback information corresponding to the second PSFCH resource in the target PSFCH resource set as one of acknowledgment ACK information or negative acknowledgment NACK information.

Optionally, in the communication device 300 provided in the embodiments of the present invention, the determining module 301 may be configured to:

determine the SL HARQ feedback information based on a second number of first sidelink channel resources respectively corresponding to each PSFCH resource in the target PSFCH resource set, where the first sidelink channel resource includes at least one of a physical sidelink shared channel PSSCH resource or a physical sidelink control channel PSCCH resource.

Optionally, in the communication device 300 provided in the embodiments of the present invention, the second number is related to PSFCH density.

Optionally, in the communication device 300 provided in the embodiments of the present invention, a value of the second number is equal to a value of the PSFCH density.

Optionally, in the communication device 300 provided in the embodiments of the present invention, the second number is related to a target sub-carrier spacing SCS, where the target SCS includes at least one of an SL SCS or a Uu SCS.

Optionally, in the communication device 300 provided in the embodiments of the present invention, in a case that the target SCS includes the SL SCS and the Uu SCS, a value of the second number is determined based on one of the following modes:

the value of the second number=SL SCS/Uu SCS; the value of the second number=a value of the PSFCH density×⌈SL SCS/Uu SCS/the value of the PSFCH density⌉; the value of the second number=the value of the PSFCH density×⌈SL SCS/Uu SCS/the value of the PSFCH density⌉; or the value of the second number=the value of the PSFCH density×SL SCS/Uu SCS.

Optionally, in the communication device 300 provided in the embodiments of the present invention, the determining module 301 may be configured to:

set, if the first sidelink channel resources are used for transmission of a corresponding first sidelink channel, the SL HARQ feedback time domain bits corresponding to the first sidelink channel resources to a decoding state or an SL HARQ feedback state corresponding to the first sidelink channel.

Optionally, in the communication device 300 provided in the embodiments of the present invention, the determining module 301 may be configured to:

set, in a case that a first preset condition is satisfied, all the SL HARQ feedback time domain bits corresponding to the first sidelink channel resources to ACK information. The first preset condition includes one of the following: the first sidelink channel resource is used for transmission of a broadcast message; sidelink control information corresponding to the first sidelink channel indicates that no SL HARQ feedback information is fed back; it is configured by a network device or pre-configured that no SL HARQ feedback information is fed back; SL HARQ feedback is disabled; a multicast option-1 mode is used for HARQ feedback, and no NACK information corresponding to the first sidelink channel resource is received; and the first sidelink channel resource is a resource for a configured grant but is not used.

Optionally, in the communication device 300 provided in the embodiments of the present invention, the determining module 301 may be configured to:

set, in a case that a second preset condition is satisfied, all the SL HARQ feedback time domain bits corresponding to the first sidelink channel resources to NACK information. The second preset condition includes one of the following: SL HARQ feedback information corresponding to the first sidelink channel resource is not received; no PSFCH corresponding to the first sidelink channel resource is received; no second signaling used for scheduling the first sidelink channel resource is detected; the first sidelink channel resources are not used for transmission of the corresponding first sidelink channel; the first sidelink channel resources are preempted; transmission corresponding to the first sidelink channel resources is dropped, abandoned, or canceled; and the first sidelink channel resources are used for transmission of the corresponding first sidelink channel, and third signaling corresponding to the first sidelink channel indicates performing SL HARQ feedback on an uplink channel corresponding to a time domain position other than a target time domain position.

Optionally, in the communication device 300 provided in the embodiments of the present invention, in a case that a third number of first sidelink channel resources in the second number of first sidelink channel resources are used for transmission of a same transport block TB or PSSCH repetition, the determining module 301 may be configured to perform one of the following:

setting SL HARQ feedback time domain bits corresponding to each of the third number of first sidelink channel resources to a decoding state or an SL HARQ feedback state corresponding to a first sidelink channel corresponding to the each of the third number of the first sidelink channel resources respectively; setting, for a fourth number of first sidelink channel resources in the third number of first sidelink channel resources, SL HARQ feedback time domain bits corresponding to each of the fourth number of first sidelink channel resources to a decoding state or an SL HARQ feedback state corresponding to a first sidelink channel corresponding to the first sidelink channel resources respectively; setting, for other first sidelink channel resources than the fourth number of first sidelink channel resources in the third number of first sidelink channel resources, all SL HARQ feedback time domain bits corresponding to each of the other first sidelink channel resources to one of ACK information or NACK information; setting the SL HARQ feedback time domain bits corresponding to the each of the fourth number of first sidelink channel resources to the decoding state or the SL HARQ feedback state corresponding to the each of the fourth sidelink channel corresponding to the each of the fourth number of the first sidelink channel resources respectively, and setting all the SL HARQ feedback time domain bits corresponding to the each of the other first sidelink channel resources to one of the ACK information or the NACK information; or setting the SL HARQ feedback time domain bits corresponding to the each of the third number of first sidelink channel resources to a decoding state or an SL HARQ feedback state corresponding to a first sidelink channel corresponding to a resource at a preset position in the third number of first sidelink channel resources respectively.

Optionally, in the communication device 300 provided in the embodiments of the present invention, the target PSFCH resource set is determined based on at least one of the first feedback time or the second feedback time.

Optionally, in the communication device 300 provided in the embodiments of the present invention, the determining module 301 may be configured to determine the target PSFCH resource set based on one of the following:

determining the target PSFCH resource set associated with the target uplink channel according to a resource position at which the target uplink channel is located and the first feedback time; determining a feedback time period according to a resource position at which the target uplink channel is located, the first feedback time, and the second feedback time, and determining, according to the feedback time period, the target PSFCH resource set associated with the target uplink channel; or determining a feedback time period according to a resource position at which the target uplink channel is located and the second feedback time, and determining the target PSFCH resource set associated with the target uplink channel according to the feedback time period.

Optionally, in the communication device 300 provided in the embodiments of the present invention, in a case that the target PSFCH resource set associated with the target uplink channel is determined according to the feedback time period, each target time in the feedback time period corresponds to at least one SL HARQ feedback time domain bit.

Optionally, in the communication device 300 provided in the embodiments of the present invention, the target time includes resources in the target PSFCH resource set.

Optionally, in the communication device 300 provided in the embodiments of the present invention, each PSFCH resource in the target PSFCH resource set corresponds to a fifth number of SL HARQ feedback time domain bits.

Optionally, in the communication device 300 provided in the embodiments of the present invention, the fifth number includes at least one of the following: the number of corresponding PSSCH resource blocks RB on each second sidelink channel resource, where the second sidelink channel resource includes at least one of a PSSCH resource or a PSCCH resource; the number of sub-channels on each second sidelink channel resource; the corresponding maximum number of PSSCHs for transmission or demodulation on each second sidelink channel resource; or the number of PSSCH RBs or the number of sub-channels in at least one target frequency domain resource, where the target frequency domain resource includes a sub-channel, a resource pool, or a bandwidth part BWP.

Optionally, in the communication device 300 provided in the embodiments of the present invention, the fifth number includes at least one of the following: the maximum number of pieces of sidelink control information SCI or the maximum number of PSCCH resources for transmission, blind detection, detection, or demodulation on each second sidelink channel resource, slot, or span; the number of pieces of SCI or the number of PSCCH resources in at least one target frequency domain resource, where the target frequency domain resource includes a sub-channel, a resource pool, or a bandwidth part BWP; the maximum number of pieces of SCI or the maximum number of PSCCH resources in the at least one target frequency domain resource; or the number of pieces of SCI or the number of PSCCH resources on each second sidelink channel resource, slot, or span.

Optionally, in the communication device 300 provided in the embodiments of the present invention, the fifth number includes at least one of the following: the maximum number of transmission PSFCH resources; or the maximum number of transmission PSFCH RBs.

Optionally, in the communication device 300 provided in the embodiments of the present invention, the fifth number includes at least one of the following: the number of PSFCH RBs in one resource pool; a maximum value in the numbers of PSFCH RBs corresponding to at least two resource pools; the number of RBs in a sub-channel in one resource pool; a maximum value in the numbers of RBs corresponding to sub-channels in at least two resource pools; the number of PSFCH RBs in a sub-channel in one resource pool; a maximum value in the numbers of PSFCH RBs corresponding to sub-channels in at least two resource pools; the number of RBs included in the BWP; or the number of PSFCH RBs included in the BWP.

Optionally, in the communication device 300 provided in the embodiments of the present invention, the fifth number includes the number of PSFCH RBs corresponding to each second sidelink channel resource.

Optionally, in the communication device 300 provided in the embodiments of the present invention, the SL corresponds to a sixth number of carriers.

Optionally, in the communication device 300 provided in the embodiments of the present invention, the number of PSFCH RBs associated with the terminal device is a seventh number.

Optionally, in the communication device 300 provided in the embodiments of the present invention, the determining module 301 may be configured to:

concatenate the SL HARQ feedback bits corresponding to the target PSFCH resource set according to at least one of a terminal device dimension, a carrier dimension, a time domain dimension, or a frequency domain dimension, to determine the SL HARQ feedback information.

Optionally, in the communication device 300 provided in the embodiments of the present invention, the target uplink channel is associated with at least one target resource, where the target resource includes a resource pool, a sub-channel, a bandwidth part BWP, or a carrier.

Optionally, in the communication device 300 provided in the embodiments of the present invention, a mode in which the target uplink channel is associated with the at least one target resource includes at least one of the following: the target uplink channel is associated with one or more target resources in the at least one target resource; a resource set of the target uplink channel is associated with one or more target resources in the at least one target resource; a format of the target uplink channel is associated with one or more target resources in the at least one target resource; a sequence of the target uplink channel is associated with one or more target resources in the at least one target resource; a frequency domain resource of the target uplink channel is associated with one or more target resources in the at least one target resource; a time domain resource of the target uplink channel is associated with one or more target resources in the at least one target resource; or a frequency hopping pattern of the target uplink channel is associated with one or more target resources in the at least one target resource.

Optionally, in the communication device 300 provided in the embodiments of the present invention, the target uplink channel is associated with a target sidelink channel resource, where the target sidelink channel resource includes at least one of a PSFCH resource, a physical sidelink shared channel PSSCH resource, or a physical sidelink control channel PSCCH resource.

Optionally, in the communication device 300 provided in the embodiments of the present invention, the target sidelink channel resource includes at least one resource outside a sidelink channel resource range corresponding to the at least one target resource.

Optionally, in the communication device 300 provided in the embodiments of the present invention, all of SL HARQ feedback information corresponding to the at least one resource outside the sidelink channel resource range corresponding to the at least one target resource is one of acknowledgment ACK information or negative acknowledgment NACK information.

Optionally, in the communication device 300 provided in the embodiments of the present invention, the target sidelink channel resource is a resource within a sidelink channel resource range corresponding to the at least one target resource.

It can be understood that, since the communication device 300 provided in the embodiments of the present invention can implement the method for determining sidelink feedback information performed by the communication device 300, related descriptions about the method for determining sidelink feedback information are all applicable to the communication device 300, and details are not described herein again.

In the embodiments of the present invention, a target PSFCH resource set associated with a target uplink channel can be accurately derived from a target time interval between the target uplink channel and a physical sidelink feedback channel PSFCH, to establish a mapping relationship between the target uplink channel and the target PSFCH resource set, so that based on this, SL HARQ feedback information corresponding to the target PSFCH resource set may be mapped to the target uplink channel for reporting. In this way, efficient and reliable HARQ feedback on the sidelink is achieved, so that a receiving party of the SL HARQ feedback information can accurately learn whether data transmission on the sidelink succeeds, thereby improving the reliability and the resource utilization of the data transmission on the SL.

Figure 8:
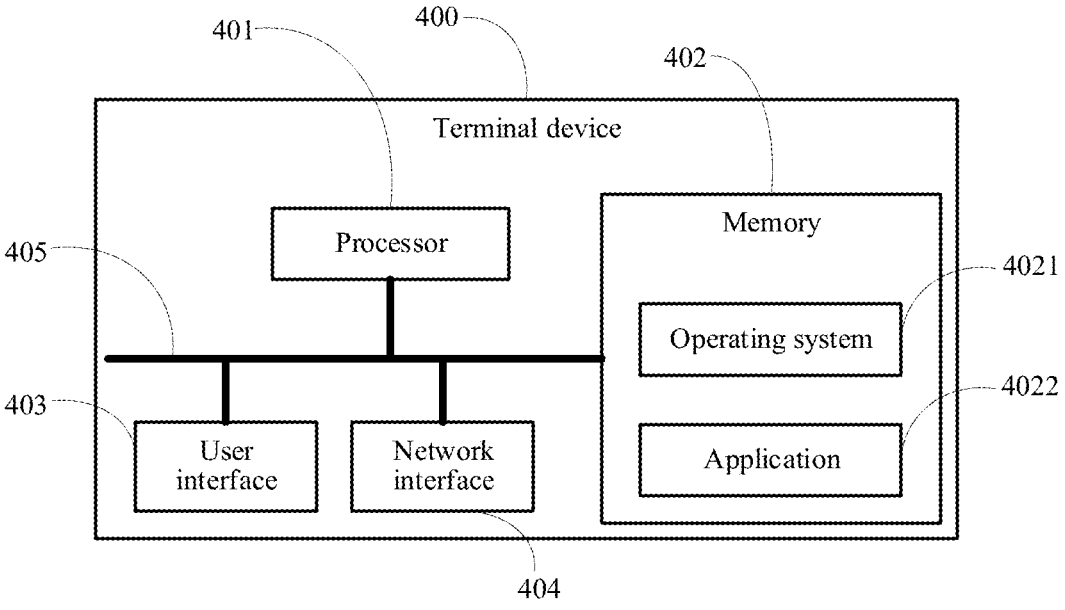
FIG. 8 is a schematic structural diagram of a terminal device according to an embodiment of the present invention.

FIG. 8 is a block diagram of a terminal device according to an embodiment of the present invention. A terminal device 400 shown in FIG. 8 includes at least one processor 401, a memory 402, at least one network interface 404, and a user interface 403. All the components in the terminal device 400 are coupled together by using the bus system 405. It may be understood that the bus system 405 is configured to implement connection and communication between the components. In addition to a data bus, the bus system 405 further includes a power bus, a control bus, and a status signal bus. However, for ease of clear description, all types of buses are labeled as the bus system 405 in FIG. 8.

The user interface 403 may include a display, a keyboard or a clicking device (for example, a mouse), a track ball, a touch panel or a touchscreen, and the like.

It may be understood that the memory 402 in the embodiments of the present invention may be a volatile memory or a nonvolatile memory, or may include a volatile memory and a nonvolatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synch Link DRAM, SLDRAM), and a direct rambus dynamic random access memory (Direct Rambus RAM, DR RAM). The memory 402 in the system and method described in the embodiments of the present invention includes, but is not limited to these memories and any other suitable types.

In some implementations, the memory 402 stores the following element, executable module, or data structure, or a subset thereof, or an extension set thereof: an operating system 4021 and an application 4022.

The operating system 4021 includes various system programs, for example, a frame layer, a core library layer, and a drive layer, used for implementing various basic services and processing tasks based on hardware. The application 4022 includes various applications, for example, a media player and a browser, used for implementing various application services. A program for implementing the method in the embodiments of the present invention may be included in the application 4022.

In the embodiments of the present invention, the communication device 400 further includes a computer program stored on the memory 402 and executable on the processor 401. When executed by the processor 401, the computer program implements the following step:

determining sidelink hybrid automatic repeat request SL HARQ feedback information based on a target physical sidelink feedback channel PSFCH resource set associated with a target uplink channel, where the target PSFCH resource set is determined based on a target time interval, where the target time interval is a spacing between the target uplink channel and a PSFCH.

The method disclosed in the foregoing embodiment of the present invention may be applied to the processor 401, or implemented by the processor 401. The processor 401 may be an integrated circuit chip having a signal processing capability. In an implementation process, steps in the foregoing methods can be implemented by using a hardware integrated logical circuit in the processor 401, or by using instructions in a form of software. The foregoing processor 401 may be a general purpose processor, a digital signal processor (DSP), an application-specific integrated circuit (ASIC), a field-programmable gate array (FPGA), or another programmable logic device, discrete gate or transistor logic device, or discrete hardware component, and can implement or execute each method, step, and logic block diagram disclosed in the embodiments of the present invention. The general-purpose processor may be a microprocessor, or the processor may be any conventional processor and the like. Steps of the method disclosed with reference to the embodiments of the present invention may be directly implemented by a hardware decoding processor, or implemented by a combination of hardware in the decoding processor and a software module. The software module may be stored in a computer-readable storage medium that is mature in the art, such as a RAM, a flash memory, a read-only memory (ROM), a programmable ROM, an electrically erasable programmable memory, or a register. The computer-readable storage medium is located in the memory 402, and the processor 401 reads information in the memory 402, and completes the steps in the foregoing methods in combination with hardware thereof. Specifically, the computer-readable storage medium stores a computer program. The computer program, when executed by the processor 401, implements steps of the method embodiments of the method for determining sidelink feedback information.

It may be understood that the embodiments described in the embodiments of the present invention may be implemented by hardware, software, firmware, middleware, microcode, or a combination thereof. For hardware implementation, a processing unit may be implemented in one or more application-specific integrated circuits (ASIC), a digital signal processor (DSP), a digital signal processing device (DSP Device, DSPD), a programmable logic device (PLD), a field-programmable gate array (FPGA), a general purpose processor, a controller, a micro-controller, a microprocessor, and other electronic units configured to execute the functions described in the present invention, or a combination of the above.

For implementation by software, the technologies in the embodiments of the present invention may be implemented by performing the functional modules (for example, a process and a function) in the embodiments of the present invention. Software code may be stored in a memory and executed by a processor. The memory may be implemented inside or outside the processor.

In the embodiments of the present invention, a target PSFCH resource set associated with a target uplink channel can be accurately derived from a target time interval between the target uplink channel and a physical sidelink feedback channel PSFCH, to establish a mapping relationship between the target uplink channel and the target PSFCH resource set, so that based on this, SL HARQ feedback information corresponding to the target PSFCH resource set may be mapped to the target uplink channel for reporting. In this way, efficient and reliable HARQ feedback on the sidelink is achieved, so that a receiving party of the SL HARQ feedback information can accurately learn whether data transmission on the sidelink succeeds, thereby improving the reliability and the resource utilization of the data transmission on the SL.

The terminal device 400 can implement various processes implemented by the communication device in the foregoing embodiments. To avoid repetition, details are not described herein again.

Figure 9:
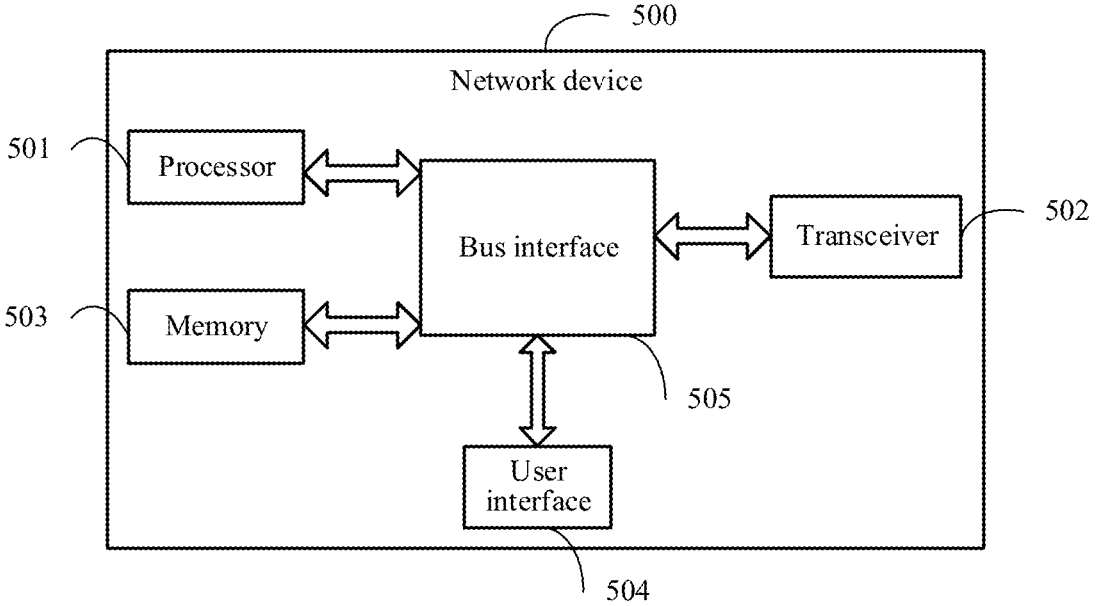
FIG. 9 is a schematic structural diagram of a network device according to an embodiment of the present invention.

FIG. 9 is a structural diagram of a network device to which an embodiment of the present invention is applied, which can implement details of the method for determining sidelink feedback information, and achieve the same effect. As shown in FIG. 9, a network device 500 includes a processor 501, a transceiver 502, a memory 503, a user interface 504, and a bus interface 505.

In the embodiments of the present invention, the network device 500 further includes a computer program stored on the memory 503 and executable on the processor 501. When executed by the processor 501, the computer program implements the following step:

determining sidelink hybrid automatic repeat request SL HARQ feedback information based on a target physical sidelink feedback channel PSFCH resource set associated with a target uplink channel, where the target PSFCH resource set is determined based on a target time interval, where the target time interval is a spacing between the target uplink channel and a PSFCH.

In FIG. 9, a bus architecture may include any number of interconnected buses and bridges, and specifically connects together circuits that are of one or more processors represented by the processor 501 and of a memory represented by the memory 503. The bus architecture may further connect various other circuits of a peripheral device, a voltage regulator, a power management circuit, and the like. This is well known in the art, and therefore, no further description is provided in this specification. The bus interface 505 provides an interface. The transceiver 502 may be a plurality of components, including a transmitter and a receiver, and providing units for communicating with various other apparatuses on a transmission medium. For different user equipments, the user interface 504 may also be an interface that can connect to a needed device externally or internally. The connected device may include, but is not limited to, a keypad, a display, a speaker, a microphone, a joystick, or the like.

The processor 501 is responsible for bus architecture management and general processing. The memory 503 may store data used by the processor when the processor 501 performs an operation.

In the embodiments of the present invention, a target PSFCH resource set associated with a target uplink channel can be accurately derived from a target time interval between the target uplink channel and a physical sidelink feedback channel PSFCH, to establish a mapping relationship between the target uplink channel and the target PSFCH resource set, so that based on this, SL HARQ feedback information corresponding to the target PSFCH resource set may be mapped to the target uplink channel for reporting. In this way, efficient and reliable HARQ feedback on the sidelink is achieved, so that a receiving party of the SL HARQ feedback information can accurately learn whether data transmission on the sidelink succeeds, thereby improving the reliability and the resource utilization of the data transmission on the SL.

Preferably, the embodiments of the present invention further provide a communication device (which may be a network device or a terminal device), including a processor, a memory, and a computer program stored in the memory and executable on the processor, where when executed by the processor, the computer program implements respective processes of the method for determining sidelink feedback information in the foregoing embodiments, and can achieve the same technical effects. To avoid repetition, details are not described herein again.

The embodiments of the present invention further provide a computer-readable storage medium, storing a computer program, where when executed by a processor, the computer program implements respective processes of the method for determining sidelink feedback information applied to the foregoing communication device (which may be a network device or a terminal device) in the foregoing embodiments, and can achieve the same technical effects. To avoid repetition, details are not described herein again. The computer-readable storage medium may include a read-only memory (ROM), a random access memory (RAM), a magnetic disk, and an optical disc.

It should be noted that terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present invention essentially, or the part contributing to the prior art, may be presented in the form of a software product. The computer software product is stored in a storage medium (for example, a ROM/RAM, a magnetic disk, or an optical disc)

including several instructions to enable a terminal (which may be a mobile phone, a computer, a server, an air conditioner, a network device, or the like) to perform the methods described in the embodiments of the present invention.

The embodiments of the present invention are described above with reference to the accompanying drawings. However, the present invention is not limited to the foregoing specific implementations. The foregoing specific implementations are merely illustrative rather than limitative. A person of ordinary skill in the art may derive various forms from the present invention without departing from the spirit of the present invention and the scope claimed by the claims, which are all under the protection of the present invention.

What is claimed is:

1. A method for determining sidelink feedback information, applied to a communication device, the method comprising:

determining a time domain position corresponding to a target time interval, wherein the target time interval is a spacing between a target uplink channel and a physical sidelink feedback channel (PSFCH);

determining, according to the time domain position, a target PSFCH resource set corresponding to the target uplink channel, wherein the target PSFCH resource set belongs to a same resource pool; and determining sidelink hybrid automatic repeat request (SL HARQ) feedback information to be transmitted on the target uplink channel based on the target PSFCH resource set, wherein the determined SL HARQ feedback information is transmitted on the target uplink channel;

wherein the determining, according to the time domain position, a target PSFCH resource set corresponding to the target uplink channel comprises:

determining a time domain position that comprises a PSFCH resource and correspond to the target uplink channel as a first PSFCH resource, wherein the target PSFCH resource set corresponding to the target uplink channel comprises the first PSFCH resource.

2. The method according to claim 1, wherein the determining sidelink hybrid automatic repeat request (SL HARQ) feedback information to be transmitted on the target uplink channel based on the target PSFCH resource set comprises:

determining the SL HARQ feedback information based on a first number of SL HARQ feedback time domain bits respectively corresponding to each PSFCH resource in the target PSFCH resource set.

3. The method according to claim 2, wherein a value of the first number is equal to a value of PSFCH density; and/or, the first number is related to PSFCH density.

4. The method according to claim 1, wherein the determining sidelink hybrid automatic repeat request (SL HARQ) feedback information to be transmitted on the target uplink channel based on the target PSFCH resource set comprises:

determining the SL HARQ feedback information based on a second number of first sidelink channel resources respectively corresponding to each PSFCH resource in the target PSFCH resource set, wherein the first sidelink channel resource comprises at least one of a physical sidelink shared channel (PSSCH) resource or a physical sidelink control channel (PSCCH) resource, wherein a value of the second number is equal to a value of PSFCH density; and/or, the second number is related to PSFCH density.

5. The method according to claim 4, wherein the determining the SL HARQ feedback information based on a second number of first sidelink channel resources respectively corresponding to each PSFCH resource in the target PSFCH resource set comprises:

setting, if the first sidelink channel resources are used for transmission of a corresponding first sidelink channel, the SL HARQ feedback time domain bits corresponding to the first sidelink channel resources to a decoding state or an SL HARQ feedback state corresponding to the first sidelink channel.

6. The method according to claim 4, wherein the determining the SL HARQ feedback information based on a second number of first sidelink channel resources respectively corresponding to each PSFCH resource in the target PSFCH resource set comprises:

setting, in a case that a first preset condition is satisfied, all the SL HARQ feedback time domain bits corresponding to the first sidelink channel resources to ACK information, wherein the first preset condition comprises one of the following:

the first sidelink channel resource is used for transmission of a broadcast message;

sidelink control information corresponding to the first sidelink channel indicates that no SL HARQ feedback information is fed back;

it is configured by a network device or pre-configured that no SL HARQ feedback information is fed back;

SL HARQ feedback is disabled;

a multicast option-1 mode is used for HARQ-ACK feedback, and no NACK information corresponding to the first sidelink channel resource is received; and the first sidelink channel resource is a resource for a configured grant but is not used;

or wherein the determining the SL HARQ feedback information based on a second number of first sidelink channel resources respectively corresponding to each PSFCH resource in the target PSFCH resource set comprises:

setting, in a case that a second preset condition is satisfied, all the SL HARQ feedback time domain bits corresponding to the first sidelink channel resources to NACK information, wherein the second preset condition comprises one of the following:

SL HARQ feedback information corresponding to the first sidelink channel resource is not received;

no PSFCH corresponding to the first sidelink channel resource is received;

no second signaling used for scheduling the first sidelink channel resource is detected;

the first sidelink channel resources are not used for transmission of the corresponding first sidelink channel;

the first sidelink channel resources are preempted;

transmission corresponding to the first sidelink channel resources is dropped, abandoned, or canceled; and the first sidelink channel resources are used for transmission of the corresponding first sidelink channel, and third signaling corresponding to the first sidelink channel indicates performing SL HARQ feedback on an uplink channel corresponding to a time domain position other than a target time domain position.

7. The method according to claim 4, wherein in a case that a third number of first sidelink channel resources in the second number of first sidelink channel resources are used for transmission of a same transport block (TB) or PSSCH repetition, the determining the SL HARQ feedback information based on a second number of first sidelink channel resources respectively corresponding to each PSFCH resource in the target PSFCH resource set comprises one of the following:

setting SL HARQ feedback time domain bits corresponding to each of the third number of first sidelink channel resources to a decoding state or an SL HARQ feedback state corresponding to a first sidelink channel corresponding to the each of the third number of first sidelink channel resources respectively;

setting, for a fourth number of first sidelink channel resources in the third number of first sidelink channel resources, SL HARQ feedback time domain bits corresponding to each of the fourth number of first sidelink channel resources to a decoding state or an SL HARQ feedback state corresponding to a first sidelink channel corresponding to the each of the fourth number of first sidelink channel resources respectively;

setting, for other first sidelink channel resources than the fourth number of first sidelink channel resources in the third number of first sidelink channel resources, all SL HARQ feedback time domain bits corresponding to each of the other first sidelink channel resources to one of ACK information or NACK information;

setting the SL HARQ feedback time domain bits corresponding to the each of the fourth number of first sidelink channel resources to the decoding state or the SL HARQ feedback state corresponding to the first sidelink channel corresponding to the each of the fourth number of the first sidelink channel resources respectively, and setting all the SL HARQ feedback time domain bits corresponding to the each of the other first sidelink channel resources to one of the ACK information or the NACK information; or setting the SL HARQ feedback time domain bits corresponding to the each of the third number of first sidelink channel resources to a decoding state or an SL HARQ feedback state corresponding to a first sidelink channel corresponding to a resource at a preset position in the third number of first sidelink channel resources respectively.

8. The method according to claim 1, wherein each PSFCH resource in the target PSFCH resource set corresponds to a fifth number of SL HARQ feedback time domain bits;

wherein the fifth number comprises at least one of the following:

the number of corresponding PSSCH resource blocks (RB) on each second sidelink channel resource, wherein the second sidelink channel resource comprises at least one of a PSSCH resource or a PSCCH resource;

the number of sub-channels on each second sidelink channel resource;

the corresponding maximum number of PSSCHs for transmission or demodulation on each second sidelink channel resource; or the number of PSSCH RBs or the number of sub-channels in at least one target frequency domain resource, wherein the target frequency domain resource comprises a sub-channel, a resource pool, or a bandwidth part (BWP);

or wherein the fifth number comprises at least one of the following:

the maximum number of pieces of sidelink control information (SCI) or the maximum number of PSCCH resources for transmission, blind detection, detection, or demodulation on each second sidelink channel resource, slot, or span;

the number of pieces of SCI or the number of PSCCH resources in at least one target frequency domain resource, wherein the target frequency domain resource comprises a sub-channel, a resource pool, or a bandwidth part BWP;

the maximum number of pieces of SCI or the maximum number of PSCCH resources in the at least one target frequency domain resource; or the number of pieces of SCI or the number of PSCCH resources on each second sidelink channel resource, slot, or span;

or wherein the fifth number comprises one of the following:

the maximum number of transmission PSFCH resources; or the maximum number of transmission PSFCH RBs;

or wherein the fifth number comprises one of the following:

the number of PSFCH RBs in one resource pool;

a maximum value in the numbers of PSFCH RBs corresponding to at least two resource pools;

the number of RBs in a sub-channel in one resource pool;

a maximum value in the numbers of RBs corresponding to sub-channels in at least two resource pools;

the number of PSFCH RBs in a sub-channel in one resource pool;

a maximum value in the numbers of PSFCH RBs corresponding to sub-channels in at least two resource pools;

the number of RBs comprised in the BWP; or the number of PSFCH RBs comprised in the BWP;

or wherein the fifth number comprises:

the number of PSFCH RBs corresponding to each second sidelink channel resource.

9. The method according to claim 1, wherein the SL corresponds to a sixth number of carriers, and the number of PSFCH RBs associated with the terminal device is a seventh number.

10. The method according to claim 1, wherein the determining sidelink hybrid automatic repeat request (SL HARQ) feedback information to be transmitted on the target uplink channel based on the target PSFCH resource set comprises:

concatenating the SL HARQ feedback bits corresponding to the target PSFCH resource set according to at least one of a terminal device dimension, a carrier dimension, a time domain dimension, or a frequency domain dimension, to determine the SL HARQ feedback information.

11. The method according to claim 1, wherein the target uplink channel is associated with at least one target resource, wherein the target resource comprises a resource pool, a sub-channel, a bandwidth part (BWP), or a carrier.

12. The method according to claim 1, wherein a target sidelink channel resource associated with the target uplink channel is a resource within a sidelink channel resource range corresponding to the at least one target resource.

13. A communication device, comprising: a memory, a processor, and a computer program stored in the memory and executable on the processor, wherein when executed by the processor, the computer program implements the following step:

determining a time domain position corresponding to a target time interval, wherein the target time interval is a spacing between a target uplink channel and a physical sidelink feedback channel (PSFCH);

determining, according to the time domain position, a target PSFCH resource set corresponding to the target uplink channel, wherein the target PSFCH resource set belongs to a same resource pool; and determining sidelink hybrid automatic repeat request (SL HARQ) feedback information to be transmitted on the target uplink channel based on the target PSFCH resource set, wherein the determined SL HARQ feedback information is transmitted on the target uplink channel;

wherein the step of determining, according to the time domain position, a target PSFCH resource set corresponding to the target uplink channel comprises:

determining a time domain position that comprises a PSFCH resource and correspond to the target uplink channel as a first PSFCH resource, wherein the target PSFCH resource set corresponding to the target uplink channel comprises the first PSFCH resource.

14. The communication device according to claim 13, wherein the step of determining sidelink hybrid automatic repeat request (SL HARQ) feedback information to be transmitted on the target uplink channel based on the target PSFCH resource set comprises:

determining the SL HARQ feedback information based on a first number of SL HARQ feedback time domain bits respectively corresponding to each PSFCH resource in the target PSFCH resource set.

15. The communication device according to claim 13, wherein the step of determining sidelink hybrid automatic repeat request (SL HARQ) feedback information to be transmitted on the target uplink channel based on the target PSFCH resource set comprises:

determining the SL HARQ feedback information based on a second number of first sidelink channel resources respectively corresponding to each PSFCH resource in the target PSFCH resource set, wherein the first sidelink channel resource comprises at least one of a physical sidelink shared channel (PSSCH) resource or a physical sidelink control channel (PSCCH) resource, wherein a value of the second number is equal to a value of PSFCH density; and/or, the second number is related to PSFCH density.

16. The communication device according to claim 15, wherein the step of determining the SL HARQ feedback information based on a second number of first sidelink channel resources respectively corresponding to each PSFCH resource in the target PSFCH resource set comprises:

setting, if the first sidelink channel resources are used for transmission of a corresponding first sidelink channel, the SL HARQ feedback time domain bits corresponding to the first sidelink channel resources to a decoding state or an SL HARQ feedback state corresponding to the first sidelink channel.

17. The communication device according to claim 13, wherein the step of determining sidelink hybrid automatic repeat request (SL HARQ) feedback information to be transmitted on the target uplink channel based on the target PSFCH resource set comprises:

concatenating the SL HARQ feedback bits corresponding to the target PSFCH resource set according to at least one of a terminal device dimension, a carrier dimension, a time domain dimension, or a frequency domain dimension, to determine the SL HARQ feedback information.

18. A non-transitory computer-readable storage medium, storing a computer program, the computer program, when executed by a processor, implementing the following step:

determining a time domain position corresponding to a target time interval, wherein the target time interval is a spacing between a target uplink channel and a physical sidelink feedback channel (PSFCH);

determining, according to the time domain position, a target PSFCH resource set corresponding to the target uplink channel, wherein the target PSFCH resource set belongs to a same resource pool; and determining sidelink hybrid automatic repeat request (SL HARQ) feedback information to be transmitted on the target uplink channel based on the target PSFCH resource set, wherein the determined SL HARQ feedback information is transmitted on the target uplink channel;

wherein the step of determining, according to the time domain position, a target PSFCH resource set corresponding to the target uplink channel comprises:

determining a time domain position that comprises a PSFCH resource and correspond to the target uplink channel as a first PSFCH resource, wherein the target PSFCH resource set corresponding to the target uplink channel comprises the first PSFCH resource.

* * * * *